US011443368B2

(12) United States Patent
Wang

(10) Patent No.: US 11,443,368 B2
(45) Date of Patent: Sep. 13, 2022

(54) RESOURCE TRANSFER AND CAPITAL TRANSFER METHOD AND APPARATUS

(71) Applicant: ADVANCED NEW TECHNOLOGIES CO., LTD., Grand Cayman (KY)

(72) Inventor: Husen Wang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/788,217

(22) Filed: Feb. 11, 2020

(65) Prior Publication Data
US 2020/0184557 A1    Jun. 11, 2020

Related U.S. Application Data

(63) Continuation of application No. PCT/CN2018/110034, filed on Oct. 12, 2018.

(30) Foreign Application Priority Data

Nov. 23, 2017  (CN) .......................... 201711183322.4

(51) Int. Cl.
  *G06Q 40/02*     (2012.01)
  *G06Q 20/38*     (2012.01)
  (Continued)

(52) U.S. Cl.
  CPC ..... *G06Q 40/025* (2013.01); *G06Q 20/38215* (2013.01); *H04L 9/0637* (2013.01); *H04L 9/3221* (2013.01)

(58) Field of Classification Search
  CPC ............ G06Q 40/025; G06Q 20/38215; H04L 9/3221; H04L 9/0637; H04L 2209/38; H04L 9/3218
  See application file for complete search history.

(56) References Cited

U.S. PATENT DOCUMENTS 10,187,368 B2   1/2019 Way
10,255,600 B2 * 4/2019 Ronca ................. H04L 41/0816
(Continued)

FOREIGN PATENT DOCUMENTS

CN    106022741 A    10/2016
CN    106846666 A    6/2017
(Continued)

OTHER PUBLICATIONS

Peters et al., "Understanding Modern Banking Ledgers through Blockchain Technologies: Future of Transaction Processing and Smart Contracts on the Internet of Money", Nov. 18, 2015.*
(Continued)

*Primary Examiner* — Steven S Kim

(57) ABSTRACT

A blockchain-based resource transfer method, includes: when a resource transfer condition is satisfied, determining a first amount of a to-be-transferred first resource; determining a second amount of a to-be-transferred second resource according to the first amount of the first resource, wherein a type of the first resource is different from a type of the second resource; initiating, by a resource transferor, a transaction request to a blockchain, to transfer the to-be-transferred second resource to a resource transferee, wherein the transaction request comprises first encrypted amount information obtained by encrypting the second amount of the second resource based on a first encrypting function, wherein inputs of the first encrypting function include the second amount of the second resource and a public key of the resource transferee; and after the blockchain verifies the transaction request, executing the transaction request, transferring the to-be-transferred second resource to the resource transferee, and recording an execution result of the transfer on the blockchain. Therefore, privacy information of both a (Continued)

resource transferor and transferee can be protected during resource transfer.

16 Claims, 9 Drawing Sheets

(51) Int. Cl.
  *H04L 9/06* (2006.01)
  *H04L 9/32* (2006.01)

(56) References Cited

U.S. PATENT DOCUMENTS

| | | | |
|---|---|---|---|
| 2013/0090951 A1* | 4/2013 | Carias | G06Q 40/08 705/4 |
| 2015/0332256 A1* | 11/2015 | Minor | G06Q 20/381 705/69 |
| 2016/0342981 A1 | 11/2016 | Thomas et al. | |
| 2016/0342983 A1 | 11/2016 | Thomas et al. | |
| 2016/0342985 A1 | 11/2016 | Thomas et al. | |
| 2017/0236102 A1 | 8/2017 | Biton | |
| 2017/0289111 A1* | 10/2017 | Voell | H04L 63/0435 |
| 2017/0300876 A1 | 10/2017 | Musiala, Jr. et al. | |
| 2017/0324738 A1 | 11/2017 | Hari et al. | |
| 2018/0150910 A1* | 5/2018 | Grech | G06Q 40/025 |
| 2018/0218176 A1* | 8/2018 | Voorhees | G06F 21/64 |
| 2018/0225469 A1 | 8/2018 | Daniel et al. | |
| 2018/0253464 A1* | 9/2018 | Kohli | G06F 16/219 |
| 2019/0057362 A1* | 2/2019 | Wright | H04L 9/0643 |
| 2019/0081789 A1* | 3/2019 | Madisetti | H04L 9/3213 |
| 2019/0130399 A1* | 5/2019 | Wright | H04L 9/3297 |
| 2019/0147431 A1* | 5/2019 | Galebach | H04L 9/3247 705/44 |
| 2019/0164137 A1* | 5/2019 | Vincent | G06Q 20/065 |
| 2019/0220615 A1 | 7/2019 | Zhang et al. | |
| 2019/0229927 A1 | 7/2019 | Guo et al. | |
| 2019/0297109 A1 | 9/2019 | Guo et al. | |
| 2019/0318329 A1 | 10/2019 | Castinado et al. | |
| 2019/0347657 A1 | 11/2019 | Guo et al. | |
| 2019/0392434 A1 | 12/2019 | Castinado et al. | |
| 2020/0012527 A1 | 1/2020 | Hartsock | |

FOREIGN PATENT DOCUMENTS

| | | | |
|---|---|---|---|
| CN | 106960388 A | 7/2017 | |
| CN | 106982205 A | 7/2017 | |
| CN | 107067243 A | 8/2017 | |
| CN | 107077675 A | 8/2017 | |
| CN | 107301536 A | 10/2017 | |
| CN | 107358424 A | 11/2017 | |
| CN | 108009441 A | 5/2018 | |
| CN | 110599170 A | 12/2019 | |
| TW | M543413 U | 6/2017 | |
| WO | 2017/090041 A1 | 6/2017 | |
| WO | 2017/145003 A1 | 8/2017 | |
| WO | 2017145008 A1 | 8/2017 | |
| WO | 2017178956 A1 | 10/2017 | |
| WO | WO-2019107654 A1 * | 6/2019 | ......... G06Q 20/0658 |
| WO | 2019193363 A1 | 10/2019 | |

OTHER PUBLICATIONS

Antonopoulos, "Mastering Bitcoin", 2010, O'Reilly Media.*
www.investopedia.com:80/terms/c/collateral.asp from waybackmachin Oct. 1, 2017.*
First Search Report for Chinese Application No. 201711183322.4 dated Feb. 27, 2020.
International Search Report for PCT Application No. PCT/CN2018/110034 dated May 31, 2019, (6 Pages).
Search Report for Taiwanese Application No. 107132969 dated May 16, 2019, (1 Page).
Supplementary Search for Chinese Application No. 201711183322.4 dated May 21, 2020.
Search Report for European Application No. 18 880 424.9 dated Sep. 14, 2020.
Written Opinion for Singapore Patent Application No. 11202001945Y dated Apr. 15, 2022.

* cited by examiner

RESOURCE TRANSFER AND CAPITAL TRANSFER METHOD AND APPARATUS

CROSS-REFERENCE TO RELATED APPLICATIONS

This application is a continuation application of International Patent Application No. PCT/CN2018/110034, filed on Oct. 12, 2018, which claims priority to and benefits of the Chinese Patent Application No. 201711183322.4, filed on Nov. 23, 2017. The contents of the above-referenced applications are incorporated herein by reference in their entirety.

TECHNICAL FIELD

The present application relates to the field of computer technologies, and in particular, to resource transfer and capital transfer methods and systems.

BACKGROUND

A blockchain technology (also known as a distributed ledger technology) is a special distributed database technology for storing simple and sequential data that can be verified in a system, and uses cryptography and a consensus algorithm to ensure that the data cannot be tampered or counterfeited. With development of computer and Internet technologies, the blockchain technology is favored for advantages such as decentralization, transparency, non-tamperablility, and trustworthiness, and is widely applied in various fields such as intelligent contracts, securities trading, e-commerce, the Internet-of-Things, social messaging, file storage, an existence proof, identity authentication, and equity-based crowdfunding.

When the blockchain technology is applied to a transaction scenario such as resource transfer, because all transaction information needs to be sent to a blockchain system for verification, implementation, and on-chain, privacy information (e.g., specific transaction information, a total amount of owned resources, and individual privacy information) of both a resource transferor and transferee that participate in the transaction is at risk of being disclosed to a third party unrelated to the transaction. For example, the blockchain technology is applied to a lending service of an Internet bank. Transaction information such as a specific amount of a loan requested by a borrower from a lender needs to be added to a blockchain, posing a threat to privacy information of both the borrower and the lender.

Therefore, a solution that can protect privacy information of both a resource transferor and transferee during resource transfer is urgently needed.

SUMMARY

Embodiments of the present application provide a resource transfer method and apparatus, a corresponding electronic device, and a computer-readable storage medium, to protect privacy information of both a resource transferor and transferee during resource transfer.

The embodiments of the present application further provide a capital transfer method and apparatus, a corresponding electronic device, and a computer-readable storage medium, to protect privacy information of both a capital borrower and lender during capital transfer.

The following technical solutions are used in the embodiment of the present application.

An embodiment of the present application provides a blockchain-based resource transfer method, including: determining, when a resource transfer condition is satisfied, a first amount of a to-be-transferred first resource; determining, according to the first amount of the first resource, a second amount of a to-be-transferred second resource, where a type of the first resource is different from a type of the second resource; initiating, by a resource transferor, a transaction request to a blockchain, to transfer the to-be-transferred second resource to a resource transferee, wherein the transaction request includes first encrypted amount information obtained by encrypting the second amount of the second resource based on a first encrypting function, wherein inputs of the first encrypting function include the second amount of the second resource, and a public key of the resource transferee; and executing, after the blockchain verifies the transaction request, the transaction request to transfer the to-be-transferred second resource to the resource transferee, and recording an execution result of the transfer on the blockchain.

In one embodiment, the transaction request further includes identification information of the public key of the resource transferee.

In one embodiment, the identification information of the public key of the resource transferee is a hash value of the public key of the resource transferee.

In one embodiment, the determining, according to the first amount of the first resource, a second amount of a to-be-transferred second resource includes: determining, according to the first amount of the first resource, the second amount of the second resource using a one-way function.

In one embodiment, the determining the second amount of the second resource using a one-way function includes: using the first amount of the first resource and a random number as inputs of the one-way function, and determining an output of the one-way function as the second amount of the second resource.

In one embodiment, the transaction request initiated by the resource transferor to the blockchain further includes an encrypted random number generated by encrypting the random number.

In one embodiment, the resource transfer condition is satisfied when the resource transferee is allowed to borrow the first resource, and the determining a first amount of a to-be-transferred first resource includes determining the first amount of the to-be-transferred first resource based on a credit limit of an allowed first resource borrowed from the first resource.

In one embodiment, the resource transfer condition is satisfied when the resource transferor has received the first resource returned by the resource transferee, and the determining a first amount of a to-be-transferred first resource comprises: determining the first amount of the to-be-transferred first resource based on an amount of the returned first resource.

In one embodiment, the resource transfer condition is satisfied when the resource transferee and the resource transferor reach a resource borrowing agreement, where the resource borrowing agreement comprises an amount of the to-be-transferred first resource that the resource transferor requests from the resource transferee, and determining a first amount of a to-be-transferred first resource comprises: determining the first amount of the to-be-transferred first resource based on the amount of the first resource requested to borrow from the resource transferee In one embodiment, the transaction request further includes a zero-knowledge proof, configured to prove that a sum of the second amount and a balance of the second resource to be held by the resource transferor after the transaction request is executed is equal to an amount of the second resource held by the resource transferor before the transaction request is initiated.

In one embodiment, the zero-knowledge proof is further configured to prove that the second amount is greater than zero, the amount of the second resource held by the resource transferor before the transaction request is initiated is greater than zero, and the balance of the second resource to be held by the resource transferor after the transaction request is executed is equal or greater than zero.

In one embodiment, the transaction request further includes identification information of a previous resource transfer transaction in which the resource transferor participates.

In one embodiment, the identification information of the previous resource transfer transaction in which the resource transferor participates is a hash value, wherein the hash value is of the previous resource transfer transaction and is recorded on the blockchain.

In one embodiment, the transaction request further comprises second encrypted amount information obtained after the balance of the second resource to be held by the resource transferor after the execution of the transaction request is encrypted.

In one embodiment, the second encrypted amount information in the transaction request is obtained by encrypting, using a second encryption function, the balance of the second resource to be held by the resource transferor after the execution of the transaction request, where an input of the second encryption function is the balance of the second resource, and another input is a public key of the resource transferor.

In one embodiment, the transaction request further comprises identification information of the public key of the resource transferor, where the identification information of the public key of the resource transferor is a hash value of the public key of the resource transferor.

In one embodiment, the identification information of the public key of the resource transferor is a hash value of the public key of the resource transferor.

In one embodiment, the first resource is capital, and the second resource is a token.

An embodiment of the present application further provides a blockchain-based capital transfer method, including determining, when a resource transfer condition is satisfied, a first amount of a to-be-transferred first resource; determining, according to the first amount of the to-be-transferred first resource, a second amount of a to-be-transferred second resource, where a type of the first resource is different from a type of the second resource; initiating, by a resource transferor, a transaction request to a blockchain to transfer the to-be-transferred second resource to a resource transferee, wherein the transaction request includes first encrypted amount information obtained by encrypting the second amount of the second resource based on a first encrypting function, wherein inputs of the first encrypting function include the second amount of the second resource, and a public key of the resource transferee; executing, after the blockchain verifies the transaction request, the transaction request to transfer the to-be-transferred second resource to the resource transferee; and recording an execution result of the transfer on the blockchain.

An embodiment of the present application provides a blockchain-based resource transfer apparatus, including: a first amount determining module, configured to: determine, when a resource transfer condition is satisfied, a first amount of a to-be-transferred first resource; a second amount determining module, configured to determine, according to the first amount of the to-be-transferred first resource, a second amount of a to-be-transferred second resource, where a type of the first resource is different from a type of the second resource; a transaction request initiation module, configured to initiate, by a resource transferor, a transaction request to a blockchain to transfer the to-be-transferred second resource to a resource transferee, wherein the transaction request includes first encrypted amount information obtained by encrypting the second amount of the second resource based on a first encrypting function, wherein inputs of the first encrypting function include the second amount of the second resource, and a public key of the resource transferee; and an on-chain module, configured to: execute, after the blockchain verifies the transaction request, the transaction request to transfer the to-be-transferred second resource to the resource transferee; and record an execution result of the transfer on the blockchain.

An embodiment of the present application further provides an electronic device, including: a processor; and a memory, configured to store a computer executable instruction, which when executed, cause the processor to perform operations comprising: determining, when a resource transfer condition is satisfied, a first amount of a to-be-transferred first resource; determining, according to the first amount of the to-be-transferred first resource, a second amount of a to-be-transferred second resource, where a type of the first resource is different from a type of the second resource; initiating, by a resource transferor, a transaction request to a blockchain to transfer the to-be-transferred second resource to a resource transferee, wherein the transaction request includes first encrypted amount information obtained by encrypting the second amount of the second resource based on a first encrypting function, wherein inputs of the first encrypting function include the second amount of the second resource, and a public key of the resource transferee; executing, after the blockchain verifies the transaction request, the transaction request to transfer the to-be-transferred second resource to the resource transferee; and recording an execution result of the transfer on the blockchain.

An embodiment of the present application further provides a non-transitory computer-readable storage medium configured with instructions executable by one or more processors to cause the one or more processors to perform operations including: determining, when a resource transfer condition is satisfied, a first amount of a to-be-transferred first resource; determining, according to the first amount of the to-be-transferred first resource, a second amount of a to-be-transferred second resource, where a type of the first resource is different from a type of the second resource; initiating, by a resource transferor, a transaction request to a blockchain to transfer the to-be-transferred second resource to a resource transferee, where the transaction request includes first encrypted amount information obtained by encrypting the second amount of the second resource based on a first encrypting function, wherein inputs of the first encrypting function include the second amount of the second resource, and a public key of the resource transferee; executing, after the blockchain verifies the transaction request, the transaction request to transfer the to-be-transferred second resource to the resource transferee; and recording an execution result of the transfer on the blockchain.

An embodiment of the present application provides a blockchain-based capital transfer apparatus, including: a capital amount determining module, configured to: determine, when a resource transfer condition is satisfied, a first amount of a to-be-transferred first resource; a token amount determining module, configured to: determine, according to the first amount of the to-be-transferred first resource, a second amount of a to-be-transferred second resource, where a type of the first resource is different from a type of the second resource; a transaction request initiation module, configured to: initiate, by a transferor, a transaction request to a blockchain, to transfer the to-be-transferred token to a transferee, wherein the transaction request includes first encrypted amount information obtained by encrypting the second amount of the second resource based on a first encrypting function, wherein inputs of the first encrypting function include the second amount of the second resource, and a public key of the resource transferee; and an on-chain module, configured to: execute, after the blockchain verifies the transaction request, the transaction request to transfer the to-be-transferred second resource to the resource transferee, and record an execution result of the transfer on the blockchain.

An embodiment of the present application provides an electronic device, including: a processor; and a memory, configured to store a computer executable instruction, where when the executable instruction is executed, the processor is enabled to perform the following operations: determining, when a resource transfer condition is satisfied, a first amount of a to-be-transferred first resource; determining, according to the first amount of the to-be-transferred first resource, a second amount of a to-be-transferred second resource, where a type of the first resource is different from a type of the second resource; initiating, by a resource transferor, a transaction request to a blockchain to transfer the to-be-transferred second resource to a resource transferee, wherein the transaction request includes first encrypted amount information obtained by encrypting the second amount of the second resource based on a first encrypting function, wherein inputs of the first encrypting function include the second amount of the second resource, and a public key of the resource transferee; executing, after the blockchain verifies the transaction request, the transaction request to transfer the to-be-transferred second resource to the resource transferee; and recording an execution result of the transfer on the blockchain.

An embodiment of the present application provides a computer-readable storage medium, the computer-readable storage medium stores one or more programs, the one or more programs include an instruction, and when the instruction is executed by an electronic device including a plurality of application programs, the electronic device is enabled to perform the following operations: determining, when a resource transfer condition is satisfied, a first amount of a to-be-transferred capital, determining, according to the first amount of the to-be-transferred capital, a second amount of a to-be-transferred token, where a type of the capital is different from a type of the token; initiating, by a resource transferor, a transaction request to a blockchain to transfer the to-be-transferred token to a resource transferee, where the transaction request includes first encrypted amount information obtained by encrypting the second amount of the second resource based on a first encrypting function, wherein inputs of the first encrypting function include the second amount of the second resource, and a public key of the resource transferee; executing, after the blockchain verifies the transaction request, the transaction request to transfer the to-be-transferred token to the resource transferee; and recording an execution result of the transfer on the blockchain.

An embodiment of the present application provides a blockchain-based resource transfer method, including: determining, when a resource transfer condition is satisfied, a first amount of a to-be-transferred first resource; determining, according to the first amount of the to-be-transferred first resource, a second amount of a to-be-transferred second resource, where a type of the first resource is different from a type of the second resource; initiating, by a resource transferor, a transaction request to a blockchain to transfer the to-be-transferred second resource to a resource transferee, where the transaction request includes first encrypted amount information obtained by encrypting the second amount of the second resource based on a first encrypting function, wherein inputs of the first encrypting function include the second amount of the second resource, and a public key of the resource transferee; executing, after the blockchain verifies the transaction request, the transaction request to transfer the to-be-transferred second resource to the resource transferee; and recording an execution result of the transfer on the blockchain In one embodiment, the determining a second amount of a to-be-transferred second resource according to the first amount of the first resource using a one-way function includes: determining, by using the first amount of the first resource and a random number as inputs of the one-way function, an output of the one-way function, where the output of the one-way function is the second amount of the second resource.

In one embodiment, the transaction request initiated by the resource transferor to the blockchain further includes an encrypted random number generated by encrypting the random number.

In one embodiment, the first resource is capital, and the second resource is a token.

An embodiment of the present application provides a blockchain-based resource transfer method, including: a processor, and a memory, configured to store a computer executable instruction, wherein when the executable instruction is executed, the processor is enabled to perform the following operations: determining, when a resource transfer condition is satisfied, a first amount of a to-be-transferred first resource; determining, according to the first amount of the to-be-transferred first resource, a second amount of a to-be-transferred second resource, wherein a type of the first resource is different from a type of the second resource; initiating, by a resource transferor, a transaction request to a blockchain to transfer the to-be-transferred second resource to a resource transferee, wherein the transaction request comprises first encrypted amount information obtained by encrypting the second amount of the second resource; executing, after the blockchain verifies the transaction request, the transaction request to transfer the to-be-transferred second resource to the resource transferee; and recording an execution result of the transfer on the blockchain.

An embodiment of the present application provides a non-transitory computer-readable storage medium configured with instructions executable by one or more processors to cause the one or more processors to perform operations comprising: determining, when a resource transfer condition is satisfied, a first amount of a to-be-transferred first resource; determining, according to the first amount of the to-be-transferred first resource, a second amount of a to-be-transferred second resource, wherein a type of the first resource is different from a type of the second resource; initiating a transaction request to a blockchain to transfer the to-be-transferred second resource to a resource transferee, wherein the transaction request includes first encrypted amount information obtained by encrypting the second amount of the second resource based on a first encrypting function, wherein inputs of the first encrypting function include the second amount of the second resource, and a public key of the resource transferee; executing, after the blockchain verifies the transaction request, the transaction request to transfer the to-be-transferred second resource to the resource transferee, and recording an execution result of the transfer on the blockchain.

The foregoing at least one technical solution used in the embodiments of the present application can achieve the following beneficial effects: in the technical solutions provided in the embodiments of the present application, when a resource transfer condition is met, a first amount of a to-be-transferred first resource is determined, based on this, the first amount of the first resource is converted into a second amount of a second resource that is of a different resource type, then a transaction request for transferring the second amount is initiated, and encrypted amount information (i.e., the encrypted second amount) is obtained by encrypting the second amount. In this way, when a blockchain verifies, implements, and performs an on-chain operation on the transaction request, information about a specific transaction between a resource transferor and a resource transferee may be hidden by encrypting the second amount. The information is specifically represented by information of the first amount of the to-be-transferred first resource. Therefore, privacy information of both the resource transferor and transferee can be protected during resource transfer.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the figures.

DETAILED DESCRIPTION OF THE INVENTION

To make the objectives, technical solutions, and advantages of this application clearer, the following clearly and completely describes the technical solutions of this application with reference to specific embodiments of this application and the corresponding accompanying drawings. Apparently, the described embodiments are only some embodiments rather than all the embodiments of this application. All other embodiments obtained by a person of ordinary skill in the art based on the embodiments of this application without creative efforts shall fall within the protection scope of this application.

A resource referred to in the present application may be specifically a type of resource that can be transferred between a plurality of parties, such as a data resource or a capital resource. On a resource management platform that is built based on a blockchain technology, resource holders may transfer resources between each other when a resource transfer condition is met. Specifically, after an amount of a to-be-transferred resource is determined, a resource transferor initiates a transaction request to a blockchain; the blockchain verifies and implements the transaction request; and after the resource transferor transfers the to-be-transferred resource to a resource transferee, the blockchain records an execution result of the transaction request on the blockchain. To resolve a problem of posing a threat to privacy information of both a resource transferor and transferee after a transaction is on-chain, an embodiment of the present application provides a blockchain-based resource transfer method. The following describes in detail the technical solutions provided by the embodiments of the present application with reference to the accompanying drawings.

Figure 1:
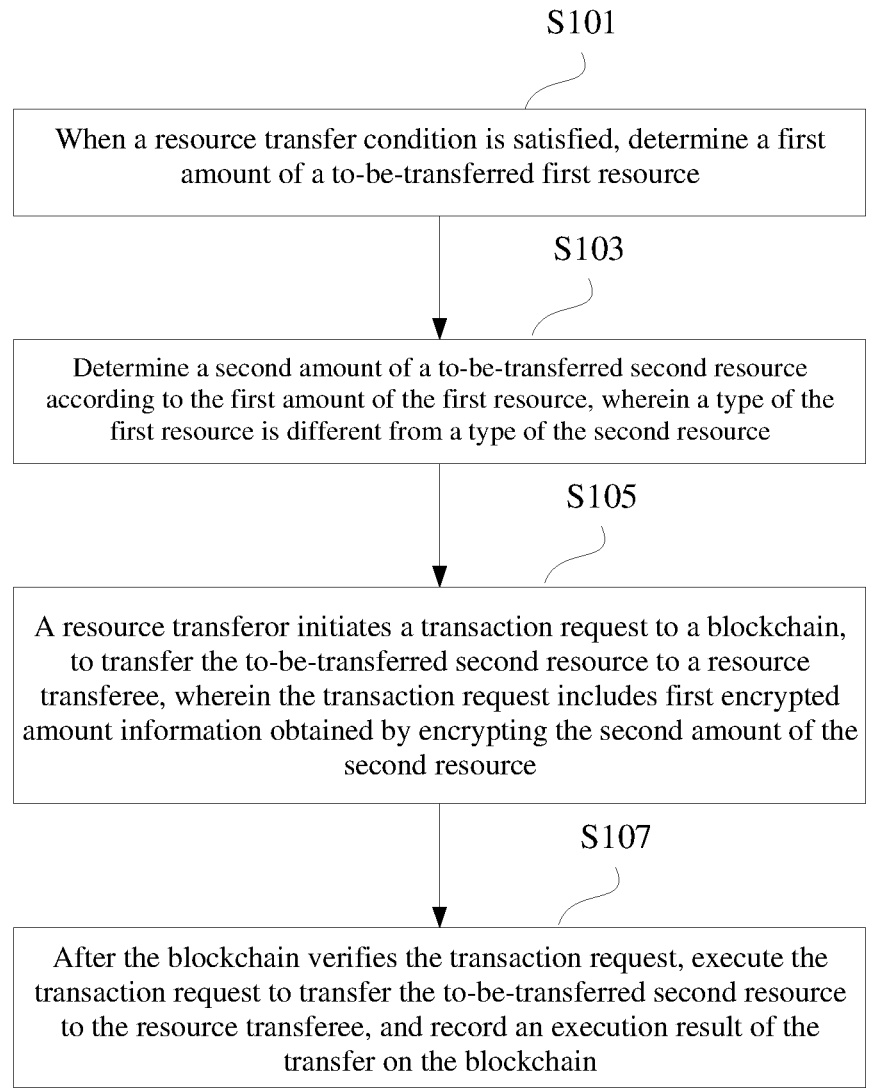
FIG. 1 is a flowchart of a resource transfer method, according to an embodiment of the present application.

Referring to FIG. 1, a blockchain-based resource transfer method is applicable to a resource transferor, including the following steps.

In S101, when a resource transfer condition is satisfied, the method may include determining a first amount of a to-be-transferred first resource.

When the resource transfer condition is satisfied and before resource transfer needs to be performed, the resource transferor needs to determine a type and an amount of a to-be-transferred resource, that is, the first amount of the to-be-transferred first resource. In addition, the resource transferor also needs to determine an object of the resource transfer, that is, a resource transferee receiving the to-be-transferred resource.

In different application scenarios, resource transfer conditions vary with different service purposes. A specific resource transfer condition may be determined and set according to an agreement between the resource transferor and transferee or a service flow of a service platform on which the resource transfer is based. Further, on the service platform on which the resource transfer is based, the resource transfer may need to be performed a plurality of times according to an actual requirement of the service flow, to achieve different purposes of different phases in the service flow. In resource transfer performed for different purposes, a type and an amount of a to-be-transferred resource and a resource transferor and a resource transferee that participate in the resource transfer may vary, and content and a format of a transaction request initiated by the resource transferor for achieving resource transfer may also vary. The following describes a plurality of different cases by way of example.

In S103, the method may include determining a second amount of a to-be-transferred second resource according to the first amount of the first resource, where a type of the first resource is different from a type of the second resource.

Step S103 is performed to convert the first resource into the second resource. Correspondingly, an amount of a resource is also converted from the first amount of the first resource into the second amount of the second resource. Therefore, during further resource transfer, transfer of the first resource may be converted into transfer of the second resource. A relationship between the first resource and the second resource may be construed as follows: the first resource is of a resource type that both the resource transferor and transferee actually need to transfer (e.g., in a lending scenario, the first resource may be capital, corresponding to a real currency), and the second resource is of a resource that is actually transferred during resource transfer (e.g., in the lending scenario, the second resource may be a token, which is a virtual currency). From a perspective of protecting privacy information of both the resource transferor and transferee, it may also be considered that the second resource is a protective shell of the first resource. In one embodiment, during resource transfer, the first resource with intrinsic value in an actual service is converted into the second resource that is explicit and may have no intrinsic value. Therefore, even if related information of the second amount of the actually transferred second resource is written on a blockchain, information about the first amount of the first resource is still hidden to protect privacy of the transaction for resource transfer.

In addition to the different types of the first resource and the second resource, a correspondence or a conversion relationship further exists between the amounts of the two types of resources. A specific conversion relationship may be set according to a requirement of the service platform. For example, the amounts of the first resource and the second resource may be directly equal, that is, conversion of the two amounts is 1:1. In this case, although a third party other than both the resource transferor and transferee may infer the first amount of the first resource by using the second amount of the second resource, the information about the second amount is not directly in a transaction request initiated in a subsequent step, and instead, the second amount is encrypted, and first encrypted amount information obtained after the encryption is in the transaction request. Therefore, information about a real amount of the resource transfer can still be protected to protect transaction privacy.

For another example, the amounts of the first resource and the second resource may be converted according to a preset conversion coefficient or a function relationship, and the real amount of the resource transfer (i.e., the first amount of the first resource) can also be protected by protecting such a conversion coefficient or function relationship. It may be understood that, the two parties participating in the resource transfer need to know such a conversion coefficient or function relationship, to achieve reverse conversion of the resource types (i.e., the second amount of a second type is converted into the first amount of a first type), to achieve a final purpose of the resource transfer.

Further, the amounts of the first resource and the second resource are preferably converted using a one-way function. In other words, the second amount of the second resource is determined according to the first amount of the first resource using the one-way function. Specifically, the first amount of the first resource and a random number may be used as inputs of the one-way function, and an output of the one-way function may be determined as the second amount of the second resource. In such as manner, a feature of the one-way function is used, and even if the second amount, instead of being not encrypted in a subsequently initiated transaction request, obtained through conversion using the one-way function is directly added to the transaction request, a real amount for the resource transfer (i.e., the first amount of the first resource) can still be protected to some extent. Certainly, based on this, the second amount is further encrypted to obtain the first encrypted amount information, and the first encrypted amount information is added to the transaction request initiated by the resource transferor, thereby better protecting privacy information of the resource transfer transaction.

When conversion between the amounts of the first resource and the second resource is implemented using the one-way function, the resource transferor further needs to send the random number (as an input of the one-way function) used during the conversion to the resource transferee, for the resource transferee to perform reverse conversion of resource types, and infer the first amount of the first resource. During specific implementation, the random number may be encrypted before the resource transferor initiates the transaction request to the blockchain, and then, the initiated transaction request carries an encrypted random number generated by encrypting the random number, thereby avoiding leakage of the random number, and protecting the privacy information of the resource transfer transaction. Specifically, the random number may be encrypted by using a public key of the resource transferee. In this way, only a private key of the resource transferee can decrypt the random number, and then the random number is used to achieve the reverse conversion of resource types, that is, the first amount of the first resource is inferred based on the second amount of the second resource.

In S105, a resource transferor may initiate a transaction request to a blockchain to transfer the to-be-transferred second resource to a resource transferee, wherein the transaction request includes first encrypted amount information obtained by encrypting the second amount of the second resource.

In one embodiment, before step S105 is performed, a step of encrypting the second amount of the second resource, to obtain first encrypted amount information may further be included. Regardless of whether the conversion relationship between the first resource and the second resource can be learned by a third part other than both the resource transferor and transferee, the information about the specific amount of the resource transfer transaction can be protected as long as the information about the second amount is encrypted, thereby protecting privacy of both the resource transferor and transferee.

The first encrypted amount information included in the transaction request may be obtained by encrypting the second amount of the second resource using a first encryption function (denoted as enc(x, y)). An input of the first encryption function is the second amount of the second resource (denoted as quota_c), and another input is the public key of the resource transferee (denoted as pk_c). If the public key of the resource transferee is an asymmetric key, the first encryption function is an asymmetric encryption function; or if the public key of the resource transferee is a symmetric key, the first encryption function is a symmetric encryption function.

In some embodiments, identification information of the public key of the resource transferee may further be used as a part of the transaction request and sent to a blockchain system, for the blockchain system to perform an on-chain operation after verification and implementation. Specifically, a hash value (denoted as hash(pk_c)) of the public key of the resource transferee may be used as the identification information of the public key.

In this case, a transaction format of the transaction request TX initiated by the resource transferor may be expressed as: TX=(enc(pk_c, quota_c), hash(pk_c)).

In different application scenarios, based on different resource transfer conditions and purposes, information in the transaction request varies. Detailed descriptions are to be provided in the following by way of example.

In S107, after the blockchain verifies the transaction request, the method may include executing the transaction request to transfer the to-be-transferred second resource to the resource transferee, and record an execution result of the transfer on the blockchain.

After the blockchain system receives the transaction request initiated by the resource transferor, each node of the blockchain verifies the transaction request. When an agreement is reached, after the transaction request is verified, the resource transferor further executes the transaction request, to transfer the to-be-transferred second resource to the resource transferee. An amount of the transferred second resource may be the second amount. After the resource transfer ends, an execution result of the transaction request is recorded on the blockchain.

When each node of the blockchain system verifies the transaction request, the node mainly verifies whether a format of the transaction request conforms to the agreement (e.g., a quantity of fields in the transaction request, a length of each field, or content of a specific field), but encrypted information in the transaction request (e.g., a first encrypted amount information or an encrypted random number in the one-way function) is directly verified to further execute the transaction request.

After a node in the blockchain verifies the transaction request of the resource transferor, the resource transferor transfers the second resource (whose amount is the second amount) to the resource transferee. After receiving the transferred second resource, the resource transferee may determine, according to the conversion relationship between the first resource and the second resource, whether an amount of the first resource that is essentially transferred in the current resource transfer transaction is the first amount.

In some embodiments, when a resource transfer condition is satisfied, a first amount of a to-be-transferred first resource is determined based on the first amount of the first resource converted into a second amount of a second resource that is of a different resource type. A transaction request for transferring the second amount then is initiated, and encrypted amount information (i.e., the encrypted second amount) is obtained by encrypting the second amount. In this way, when a blockchain verifies, implements, and performs an on-chain operation on the transaction request, information about a specific transaction between a resource transferor and a resource transferee may be hidden by encrypting the second amount. The information is specifically represented by information of the first amount of the to-be-transferred first resource. Therefore, privacy information of both the resource transferor and transferee can be protected during resource transfer.

In some embodiments, information about a specific transaction amount, that is, the first amount of the to-be-transferred first resource, is first protected during the resource transfer. In different scenarios, the resource transfer condition may vary, the manner of determining the first amount of the to-be-transferred first resource may vary, and the determined first amount may also vary. Examples are provided in the following descriptions.

(1) The resource transfer condition is satisfied when the resource transferee is allowed to borrow the first resource. The resource transferor or another participant agreed upon in the service system has reviewed qualifications and a capability of the resource transferee for borrowing the first resource, and determined a credit limit of the first resource that the resource transferee is allowed to borrow. In this case, the purpose of transferring the resource to the resource transferee by the resource transferor may be understood as the service system approving the borrowing of the first resource by the resource transferee, and issuing, to the resource transferee, a voucher of an amount of the first resource that is allowed to borrow. In this scenario, the resource transferor is a service participant agreed upon in the service system to issue a credit limit voucher, and the resource transferee is a service participant that is allowed borrow the first resource. After the current resource transfer is completed, an amount of a second resource held by the resource transferee reflects a credit limit of a resource that can be borrowed by the resource transferee.

Therefore, when the first amount of the to-be-transferred first resource is determined, the credit limit of the first resource that the resource transferee is allowed to borrow may be used as the first amount of the to-be-transferred first resource. Based on this, the second amount of the second resource determined according to the first amount of the first resource can also reflect the credit limit of the resource that the resource transferee is allowed to borrow. Therefore, the first encrypted amount information (the information is obtained after the second amount is encrypted) in the transaction request initiated by the resource transferor for transferring the second resource can also reflect the amount of the first resource that the resource transferee is allowed to borrow. The first encrypted amount information is the voucher issued to the resource transferee to allow the resource transferee to borrow the first resource. Since the first encrypted amount information that is known to both the resource transferor and transferee is confidential data (the second amount of the second resource cannot be known) for a third party, such a manner can protect privacy information of the credit limit of the first resource that the resource transferee is approved to borrow, thereby achieving the technical purpose of this embodiment of the present application.

It should be further noted that, recording, on the blockchain, the transaction request for issuing the credit limit voucher to the resource transferee after the service system approves the resource transferee to borrow the first resource may help regulate and restrict the amount of the first resource borrowed by the resource transferee not exceeding the allowed credit limit, thereby protecting interests of the party lending the resource.

(2) The resource transfer condition is satisfied when the resource transferor has received a first resource returned by the resource transferee, which may mean that, in an actual service flow, the resource transferee is a borrower of the first resource, and the resource transferor is a lender of the first resource. The resource transferee transfers to the resource transferor the first resource that needs to be returned, to return the borrowed first resource to the resource transferor, and this process is not written on the blockchain. After the resource transferor receives the first resource returned by the resource transferee off-chain, the resource transferor performs the resource transfer method in the embodiments of the present application, to transfer the second resource corresponding to an amount of the returned first resource to the resource transferee. In this case, the purpose of the resource transfer is to restore or make up the credit limit for the resource transferee after the resource transferee returns the borrowed resource.

Therefore, when the first amount of the to-be-transferred first resource is determined, the amount of the returned first resource may be determined as the first amount of the to-be-transferred first resource. During the resource transfer, the second resource corresponding to the first amount of the first resource is transferred to the resource transferee, to restore the credit limit of the resource borrowed by the resource transferee. It may be further understood that, after the current resource transfer is completed, an amount of a second resource held by the resource transferee reflects a remaining credit limit of a resource that can be borrowed by the resource transferee.

When the resource transferor initiates the transaction request, the second amount of the second resource that is determined based on the first amount of the first resource is encrypted, thereby protecting privacy data of an amount of a resource actually returned by the resource transferee, achieving the technical purpose of the present application.

After the resource borrower returns the first resource, the second resource of the corresponding amount is transferred to the resource borrower, and the transaction of transferring the second resource is written on the blockchain. In this way, on one hand, the credit limit is restored or made up for the resource borrower, to ensure a normal transaction of the resource borrower, and on the other hand, the amount of the resource borrowed by the resource borrower is regulated and restricted, thereby protecting interests of the resource lender.

(3) The resource transfer condition is satisfied when the resource transferee and the resource transferor have reached a resource borrowing agreement that includes an amount of a first resource that the resource transferor requests to borrow from the resource transferee. Corresponding to an actual service flow, in this scenario, the resource transferor is a borrower of the first resource, and the resource transferee is a lender of the first resource. After both the borrower and the lender reach the resource borrowing agreement, the borrower (corresponding to the resource transferor in this scenario) transfers, to the lender (corresponding to the resource transferee in this scenario), a part that is of the second resource held by the borrower and that corresponds to the amount of the first resource that is requested to borrow, and this process is written on the blockchain after receiving the transferred second resource, the lender further transfers, to the borrower, the first resource that should be lent to the borrower and that is agreed upon in the resource borrowing agreement, this process does not need to be written on the blockchain and is implemented off-chain by using conventional service means.

In this scenario, the borrower (the resource transferor) transfers, to the lender (the resource transferee), the part that is of the second resource held by the borrower and that corresponds to the amount of the first resource that is requested to borrow. The purpose of performing the resource transfer and recording the resource transfer transaction on the blockchain may be understood as follows: on one hand, the resource transferor proves to the resource transferee that the credit limit (represented as the amount of the second resource held by the resource transferor before the resource transfer) of the resource borrowed by the resource transferor meets a requirement of the amount of the resource that is requested to borrow, for the resource transferor to borrow a first resource with intrinsic value from the resource transferee. On the other hand, after the resource transferor transfers the second resource of the corresponding amount, the amount of the second resource held by the resource transferor is reduced accordingly, and this is equivalent to reduction of a credit limit of a resource that the resource transferor is allowed to borrow. Writing the transaction of reducing the credit limit on the blockchain helps regulate and restrict the amount of the resource borrowed by the resource borrower, thereby protecting interests of the resource lender.

In this scenario, the amount of the first resource that is requested to borrow in the resource borrowing agreement may be determined as the first amount of the to-be-transferred first resource, and then the second amount of the to-be-transferred second resource is determined based on this, to transfer the second resource.

In the foregoing examples of the example (3), the credit limit of the resource borrower (serving as the resource transferor in the current resource transfer) requesting to borrow the first resource is restricted. Therefore, to achieve the resource transfer, the resource transferor needs to prove legitimacy of the current resource transfer transaction to nodes on the blockchain other than the nodes participating in the current resource transfer transaction (the nodes corresponding to the resource transferor and the resource transferee).

In some embodiments, a zero-knowledge proof may be added to the transaction request initiated by the resource transferor, to prove that a sum of the second amount and a balance of a second resource to be held by the resource transferor after the transaction request is executed is equal to an amount of a second resource held by the resource transferor before initiating the transaction request. By using the zero-knowledge proof, the resource transferor can prove authenticity of related content to each node on the blockchain without exposing any specific information (including the amount of the resource transfer, and the like). Specifically, it may be understood as proving that the foregoing conclusion that "a sum of the second amount and a balance of a second resource to be held by the resource transferor after the transaction request is executed is equal to an amount of a second resource held by the resource transferor before initiating the transaction request" is true.

Specifically, if the balance of the second resource to be held by the resource transferor is denoted as quota_c', the second amount of the to-be-transferred second resource is denoted as quota_d, and the amount of the second resource held by the resource transferor before initiating the transaction request is denoted as quota_c, a function proof(x) of the foregoing zero-knowledge proof may be expressed as proof (quota_c'=(quota_c−quota_d)). The function of the zero-knowledge proof proves that the equation (quota_c'=(quota_c−quota_d)) exactly holds.

Based on this, a transaction format of the transaction request TX initiated by the resource transferor to the blockchain may be expressed as:

$$Tx=(enc(pk\_d,quota\_d),hash(pk\_d),proof((quota\_c-quota\_d-quota\_c'==0))).$$

The resource transferor may further prove the following items to each node on the blockchain by using the zero-knowledge proof: the amount, that is, the second amount quota_d, of the second resource transferred out by the resource transferor is greater than zero, the amount quota_c of the second resource held by the resource transferor before initiating the transaction request is greater than zero, and the balance quota_c' of the second resource to be held by the resource transferor after the transaction request is executed is not less than zero. Therefore, the function of the zero-knowledge proof may be expressed as:

proof((quota_c−quota_d−quota_c'==0)&& (quota_c>0)&&(quota_d>0)&&(quota_c'≥0)).

In this case, a transaction format of the transaction request TX initiated by the resource transferor to the blockchain may be expressed as:

Tx=−(enc(pk_d,quota_d),hash(pk_d),proof((quota_c−quota_d−quota_c'==0)&&(quota_c>0)&& (quota_d>0)&&(quota_c'≥0))).

In some embodiments, the transaction request may further include identification information (which may be denoted as Tx_in) of a previous resource transfer transaction in which the resource transferor participates, and the identification information may be specifically set to a hash value that is of the previous resource transfer transaction and that is recorded on the blockchain. It should be noted that, the previous resource transfer transaction in which the resource transferor participates may be a resource borrowing transaction, or a transaction of determining a borrowing credit limit, or a transaction of increasing the credit limit after the resource is returned. Sending the identification information of the previous resource transfer transaction in which the resource transferor participates to the blockchain for verification helps ensure consistency of the change in the amount of the second resource held by the resource transferor (serving as the resource borrower). In this case, a transaction format of the transaction request TX initiated by the resource transferor to the blockchain may be expressed as:

Tx=(Tx_in,(enc(pk_d,quota_d),hash(pk_d)),proof ((quota_c−quota_d−quota_c'==0)&& (quota_c>0)&&(quota_d>0)&&(quota_c'>0))).

In some embodiments, the transaction request may further include second encrypted amount information obtained after a balance (denoted as quota_c') of the second resource to be held by the resource transferor after the transaction request is encrypted. Specifically, the balance quota_c' of the second resource to be held by the resource transferor after the transaction request is executed may be encrypted using a second encryption function (denoted as enc(x, y)). An input of the second encryption function is the balance (denoted as quota_c') of the second resource, and another input is a public key (denoted as pk_c) of the resource transferor. It may be understood that, if the public key of the resource transferor is an asymmetric key, the second encryption function is an asymmetric encryption function; or if the public key of the resource transferor is a symmetric key, the second encryption function is a symmetric encryption function.

In some embodiments, identification information of the public key of the resource transferor may further be used as a part of the transaction request and sent to a blockchain system, for the blockchain system to perform an on-chain operation after verification and implementation. Specifically, a hash value (denoted as hash(pk_c)) of the public key of the resource transferor may be used as the identification information of the public key. In this case, a transaction format of the transaction request TX initiated by the resource transferor may be expressed as:

Tx=(Tx_in,(enc(pk_d,quota_d),hash(pk_d)),(enc(pk_c, quota_c'),hash(pk_c)),proof((quota_c−quota_d−quota_c'==0)&&(quota_c>0)&&(quota_d>0) &&(quota_c'>0))).

Specific implementations of the resource transfer method provided in the embodiments of the present application in different scenarios during resource transfer for different purposes are described above by using examples from a plurality of perspectives. In different resource transfer conditions, purposes for performing the resource transfer are different, and roles of resource transfer participants in the service flow are different. Regardless of the purpose for performing resource transfer, when the transaction request for transferring the second amount is initiated to the blockchain, information about a specific transaction between the resource transferor and the resource transferee may be hidden by encrypting the second amount. The information is specifically represented as information about the first amount of the to-be-transferred first resource. Therefore, privacy information of both the resource transferor and transferee can be protected during resource transfer.

Figure 2:
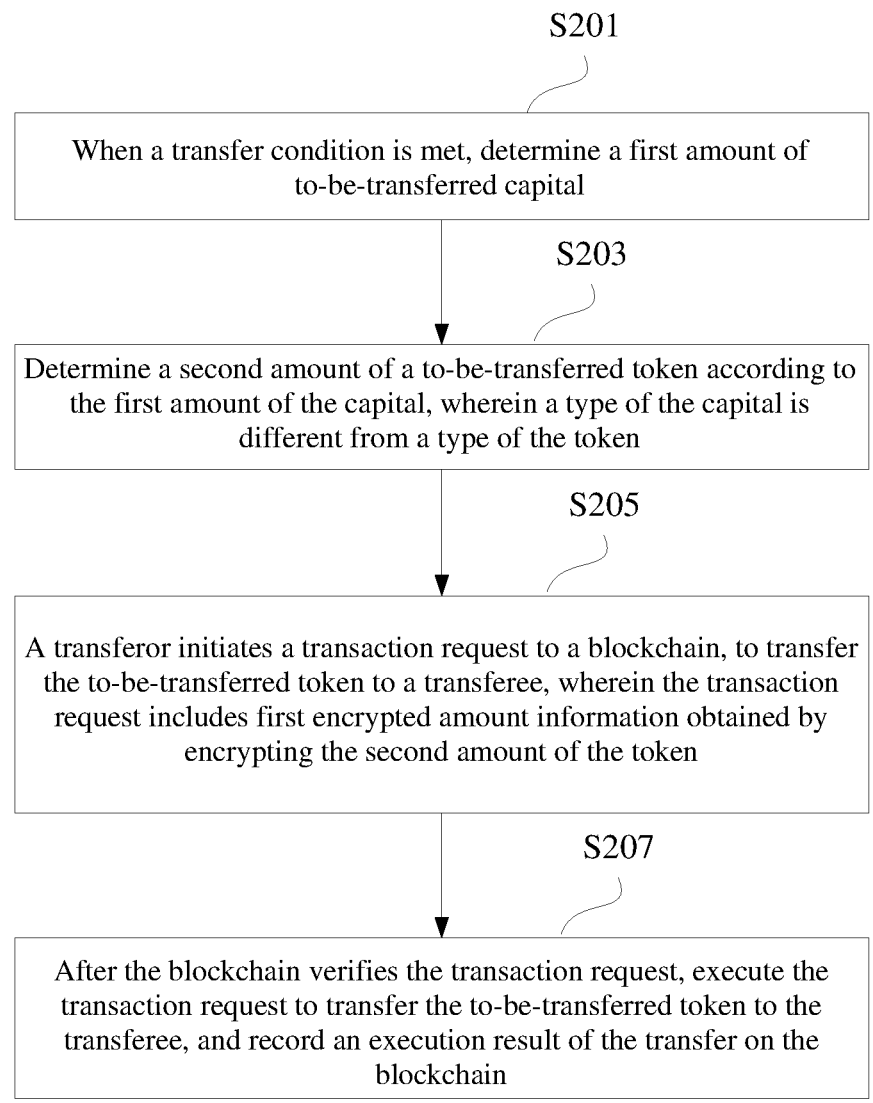
FIG. 2 is a flowchart of a capital transfer method, according to an embodiment of the present application.

In some embodiments, the first resource is specifically capital, and the second resource is specifically a token. Referring to FIG. 2, the scenario involves a blockchain-based capital transfer method.

In S201, when a transfer condition is satisfied, the method may include determining a first amount of to-be-transferred capital.

In S203, the method may include determining a second amount of a to-be-transferred token according to the first amount of the capital, where a type of the capital is different from a type of the token.

In S205, a transferor may include initiating a transaction request to a blockchain, to transfer the to-be-transferred token to a transferee, where the transaction request includes first encrypted amount information obtained by encrypting the second amount of the token.

In S207, after the blockchain verifies the transaction request, the method may include executing the transaction request to transfer the to-be-transferred token to the transferee, and record an execution result of the transfer on the blockchain.

It may be understood that, various aspects of specific implementations of the foregoing blockchain-based capital transfer method are the same as those of the blockchain-based resource transfer method in the foregoing embodiment. Therefore, illustrations and descriptions related to the resource transfer method in the foregoing embodiments are applicable to a resource lending method in the capital lending scenario. The following describes the specific implementations of this embodiment mainly by using a service flow of capital lending as an example.

In the application scenario of capital lending, the service flow may include a credit assessment and token issuance phase, a loan application and issuance phase, a repayment phase, and the like.

(I) Credit Assessment and Token Issuance Phase

During credit assessment, a specific institution A may be predetermined, to assess a credit rating of a user, and provides a credible conclusion on a credit limit of a loan to be issued to the user. The specific institution A may be reviewed and appointed by a fund supervision department according to relevant regulations, or may be selected or agreed upon by an institution participating in loan issuance. The specific institution A is mainly responsible for performing a credit assessment of the user according to related information of the user, and determine the credit limit (represented in a form of a real currency, i.e., capital, that is, the first amount of the first resource described above in the embodiments of the present application) of the loan to be issued to the user.

During specific implementation, related information of a user C intended to apply for a loan usually involves personal privacy of the user C, for example, personal information such as a name of the user and an ID card number, and information related to a financing capability of the user C such as income data, consumption information, and a repayment status of the use. To protect privacy of the user C, the information provided by the user C for the specific institution A is not disclosed to another institution, for example, a loan issuance institution, but is known only to the specific institution A.

When the user C intended to apply for a loan is allowed to apply for the loan after the credit assessment is performed on the user C, and a loan issuance credit limit is determined for the user C, the specific institution A sends an assessment result (including the loan issuance credit limit) to a preset specific institution B, and the specific institution B issues a token (represented in a form of a virtual currency, i.e., the second resource described above in the embodiments of the present application) of an amount corresponding to the loan issuance credit limit to the user C intended to apply for the loan. During specific implementation, the specific institution A and the specific institution B may be concurrently served by a same entity.

In the credit assessment and token issuance phase, when the loan for the user C intended to apply for a loan is allowed (equivalent to meeting a transfer condition), a loan issuance credit limit that the user C is allowed borrow is determined as a first amount of to-be-transferred capital, and based on this, a second amount of a to-be-transferred token is determined (as described in the foregoing embodiment, a correspondence between the first amount of the capital and the second amount of the token may be implemented in a plurality of manners). In this case, a transferor is specifically the foregoing specific institution B, a transferee is specifically the user C intended to apply for a loan, and a transaction request initiated by the transferor to a blockchain includes first encrypted amount information obtained by encrypting the second amount (denoted as quota_c) of the token.

Specifically, the first encrypted amount information may be obtained by encrypting the second amount quota_c of the token by using a first encryption function (denoted as enc(x, y)). An input of the first encryption function is the second amount quota_c of the token, and another input is a public key (denoted as pk_c) of the transferee (that is, the user C). If the public key of the transferee is an asymmetric key, the first encryption function is an asymmetric encryption function; or if the public key of the transferee is a symmetric key, the first encryption function is a symmetric encryption function.

Further, identification information of the public key pk_c of the transferee may further be used as a part of the transaction request and sent to a blockchain system, for the blockchain system to perform an on-chain operation after verification and implementation. Specifically, a hash value (denoted as hash(pk_c)) of the public key of the transferee may be used as the identification information of the public key. In this case, a transaction format of the transaction request TX initiated by the transferor (that is, the specific institution B) may be expressed as:

$$TX=(enc(pk\_c,quota\_c),hash(pk\_c)).$$

In this embodiment of the present application, an amount (represented as quota_c herein) of the token held by the user C can reflect an actual amount (i.e., the loan issuance credit limit) of capital that the user C is allowed to borrow. When the user C has borrows a part of the capital (the actual amount of the borrowed capital should not be greater than the foregoing loan issuance credit limit), the amount of the token held by the user C is reduced, indicating that the credit limit of the capital that can be borrowed by the user C is reduced; when the user C returns the borrowed capital, the amount of the token held by the user C is increased, indicating that the credit limit of the capital that can be borrowed by the user C is restored or made up.

In a service flow, the credit assessment may be performed on the user C again regularly or periodically, to adjust the loan issuance credit limit of the user. When the credit limit is increased, the specific institution B may perform the foregoing capital transfer process to issue a difference of the credit limit to the user C. In this case, the difference of the credit limit is determined as the first amount of the to-be-transferred capital. When the credit limit is reduced, the user may be required to return a difference of the credit limit to the specific institution B within a specified time period. In this capital transfer process, the user C serves as the transferor, the specific institution B serves as the transferee, and the difference of the credit limit is determined as the first amount of the to-be-transferred capital.

If the user fails to return, to the specific institution B on time, the difference of the credit limit that needs to be returned due to the reduction of the credit limit, the specific institution B may send a blacklist to all loan issuance institutions, to restrict the user C from applying for a loan, and to allow only receiving repayments from the user C until the user C returns the difference of the credit limit.

In the foregoing manner, the token representing the loan amount is issued to the user C, and the issuance process is written on the blockchain, helping regulate the loan amount of the user C, thereby reducing the risk of loan lending by a loan issuance institution, and ensuring transaction security.

Figure 3:
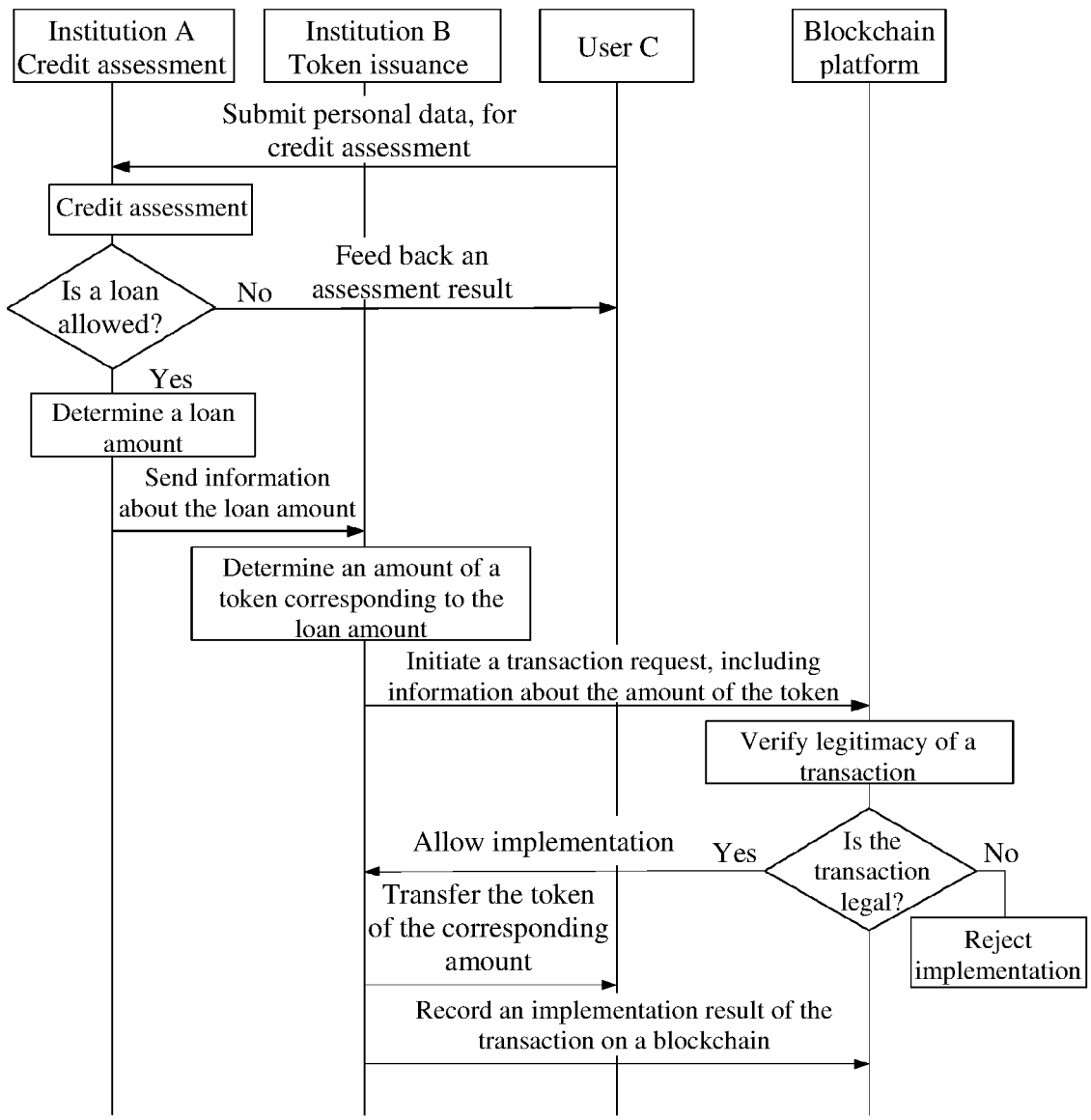
FIG. 3 is a schematic diagram of a service flow in a token issuance phase of a capital transfer method in a capital lending scenario, according to an embodiment of the present application.

Referring now to FIG. 3, FIG. 3 is a schematic diagram of a service flow in a credit assessment and token issuance phase.

First, the user C submits personal data to the institution A that performs credit assessment, for the institution A to assess credit of the user C.

Second, the institution A determines, according to a result of the credit assessment, whether to allow the user C to apply for the loan, determines an allowed loan amount (equivalent to the first amount of the first resource or the first amount of the capital, and represented as a real currency), and feeds back the result of the credit assessment to the user C.

Third, the institution A sends information about the allowed credit limit of the loan of the user C to the institution B, for token issuance. The institution B determines, according to the information about the credit limit, an amount (equivalent to the second amount of the second resource or the second amount of the token, and represented as a virtual currency) of the token corresponding to the loan amount.

Subsequently, the institution B (serving as the resource transferor or the transferor) initiates a transaction request to a blockchain platform, where the transaction request includes information about the amount of the token. To protect privacy, the information is encrypted information obtained after the amount of the token is encrypted. After verifying legitimacy of the transaction request, the blockchain platform allows the institution B to implement the transaction request. In addition, after the institution B transfers the token of the corresponding amount to the user C (serving as the resource transferee or the transferee), an implementation result of the transaction is recorded on the blockchain.

In this way, the credit assessment and token issuance for the user C are completed. The amount of the token held by the user C reflects the credit limit of the loan that the user C is allowed to borrow.

(II) Loan Application and Issuance Phase

When the user C needs to apply for a loan, the user C may reach a loan agreement (equivalent to the resource borrowing agreement in the resource transfer process) with a lending institution D, to determine the amount (equivalent to the first amount of the first resource) of the capital that the user C requests to borrow. After the loan agreement is reached, the corresponding second amount (equivalent to the second amount of the second resource) of the token is determined according to the first amount that is of the capital that is requested to borrow and that is determined in the agreement. The user C sends the held token to the lending institution D, where the amount of the token is the second amount and is denoted as quota_d, and further, may return a balance (denoted as quota_c') of the held token to an account of the user C. After receiving the token (a virtual currency) from the user C, the lending institution D may send capital (a real currency) to the user C, for the user C to obtain the capital that is requested to borrow.

In the foregoing process, the user C sends a transaction request to the blockchain, to send the token whose amount is quota_d to the lending institution D. The transaction request may include first encrypted amount information obtained by encrypting quota_d, reflecting the amount of the token to be transferred to the institution D; or may further include second encrypted amount information obtained by encrypting the balance quota_c' of the token held by the user C, reflecting the balance of the token to be returned to the account of the user C; or may further include identification information (which may be denoted as Tx_in) of a previous capital transfer transaction in which the user C participates, where the identification information may be specifically set to a hash value that is of the previous capital transfer transaction and that is recorded on the blockchain, or may be a preset identifier for distinguishing between different transactions, reflecting a basis for determining the amount quota_c of the token held by the user C.

In addition, a zero-knowledge proof may further be added to the transaction request from the user C to the blockchain, used for proving that a sum of the amount quota_d of the transferred token and the balance quota_c' of the token to be held by the transferor (the user C) after the transaction request is executed is equal to an amount quota_c of a token held by the transferor (the user C) before initiating the transaction request. In other words, the zero-knowledge proof is used to prove that the equation ((quota_c−quota_d)= quota_c') holds. Further, the zero-knowledge proof may be further used for proving that the amount quota_d of the token transferred out by the transferor (the user C) is greater than zero, the amount quota_c of the token held by the transferor (the user C) before initiating the transaction request is greater than zero, and the balance quota_c' of the token to be held by the transferor (the user C) after the transaction request is executed is not less than zero.

Therefore, a transaction format of the transaction request initiated by the user C to the blockchain may be expressed as:

$$Tx=(Tx\_in, enc(pk\_d, quota\_d), hash(pk\_d), enc(pk\_c, quota\_c'), hash(pk\_c), proof((quota\_c-quota\_d-quota\_c'==0) \&\& (quota\_c>0) \&\& (quota\_d>0) \&\& (quota\_c'>0))).$$

In the foregoing transaction request, Tx_in may be understood as an input of the current transaction, reflecting a source of the amount of the token held by the user C (which is the transferor herein). enc(pk_d, quota_d) and hash(pk_d) may be understood as a first output of the current transaction, reflecting the amount quota_d of the token sent by the user C to the institution D, and also reflecting the amount of the token from the user C and received by the institution D. enc(pk_c, quota_c') and hash(pk_c) may be understood as a second output of the current transaction, reflecting the remaining amount quota_c', equivalent to a change obtained after the user C sends the token, of the token after the user C completes the token transfer. The zero-knowledge proof is used for proving legitimacy of the current transaction to a node not participating in the current transaction on the blockchain, without leaking a specific amount of the current transaction, thereby protecting privacy of both parties of the transaction.

Making the transaction on-chain can write change statuses of the tokens held by the two parties (the user C and the lending institution D) participating in the transaction in the blockchain, thereby regulating legitimacy of the transaction, and preventing the user C from applying for a loan exceeding the loan credit limit. In addition, privacy of both parties of the transaction is protected by encrypting the specific amount of the transferred token and proving legitimacy by using the zero-knowledge proof.

Figure 4:
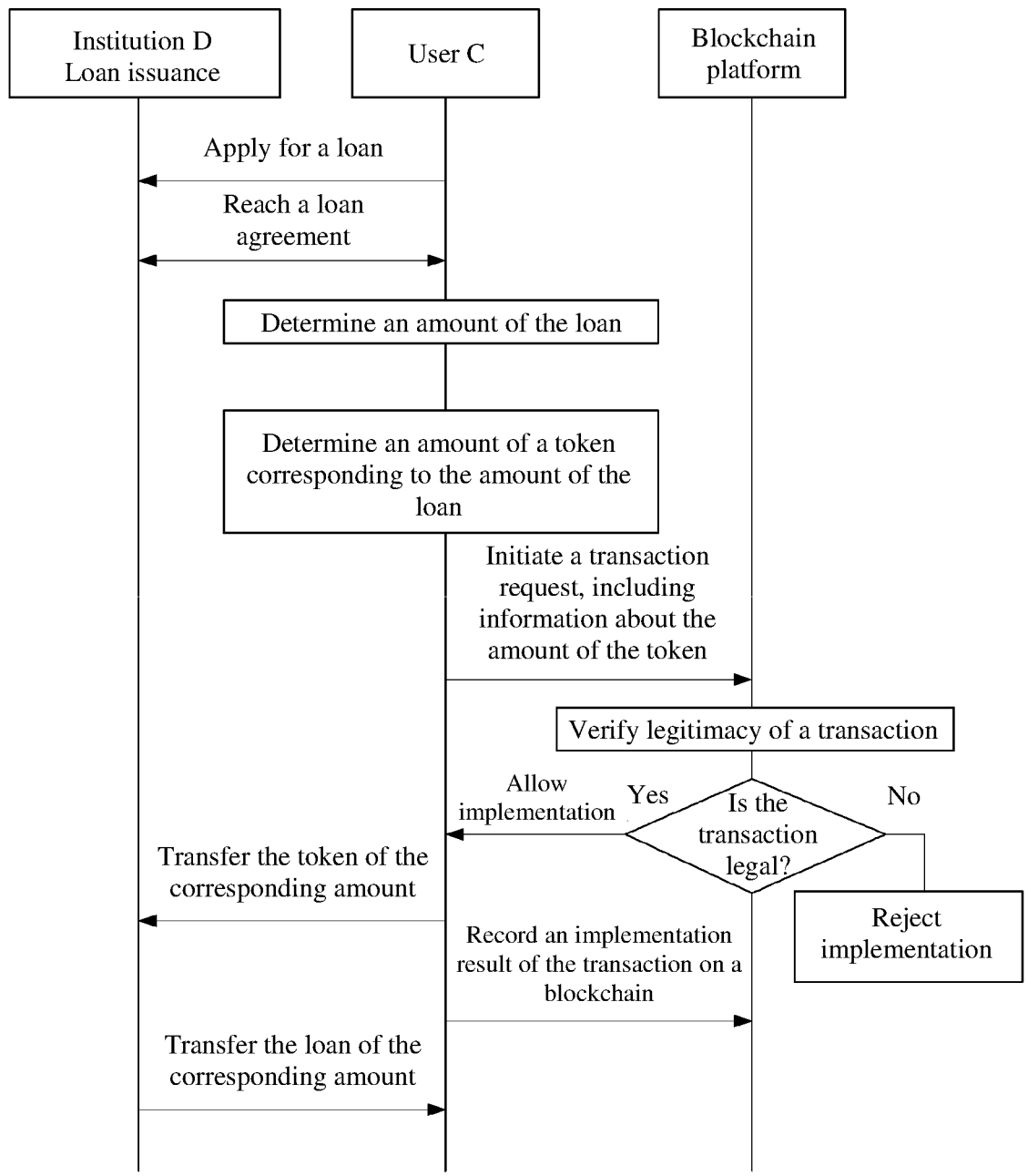
FIG. 4 is a schematic diagram of a service flow in a loan application phase of a capital transfer method in a capital lending scenario, according to an embodiment of the present application.

Referring now to FIG. 4, FIG. 4 is a schematic diagram of a service flow in a loan application and issuance phase.

First, the user C applies to the loan issuance institution D for a loan. After reaching a loan agreement with the institution D, the user C determines an amount (equivalent to the first amount of the first resource or the first amount of the capital, and represented as a real currency) of the loan as agreed upon in the loan agreement, and then determines, based on this, an amount (equivalent to the second amount of the second resource or the second amount of the token, and represented as a virtual currency) of a token that corresponds to the amount of the loan.

Second, the user C (serving as the resource transferor or the transferor) initiates a transaction request to a blockchain platform, where the transaction request includes information about the amount of the token. To protect privacy, the information is encrypted information obtained after the amount of the token is encrypted. After verifying legitimacy of the transaction request, the blockchain platform allows the user C to implement the transaction request. In addition, after the user C transfers the token of the corresponding amount to the institution D (serving as the resource transferee or the transferee), an implementation result of the transaction is recoded on the blockchain.

Subsequently, after receiving the token transferred by the user C, the institution D issues the loan of the corresponding amount to the user C.

In this way, the user C completes the loan application, and the institution D completes the loan issuance. After the transaction is completed, the amount of the token held by the user C is reduced, and a balance of the held token reflects a remaining credit limit of the loan that the user C is allowed to borrow.

(III) Repayment Phase

When the user C needs to repay the loan to the lending institution D, the user C first remits money to a bank account of the lending institution D, to repay the loan in a real currency (equivalent to the first resource). Then, after receiving the real currency returned by the user C, the lending institution D initiates a transaction request to the blockchain, to transfer, to the user C, a token (equivalent to the first resource) corresponding to the real currency returned by the user C, thereby restoring or making up the loan amount for the user C.

Specifically, a transaction format of the transaction request TX initiated by the transferor (which is the lending institution D herein) may be expressed as:

$$TX=(enc(pk\_c, quota\_d), hash(pk\_c)).$$

The transaction request may be understood as encrypting, by using an encryption function, the amount quota_d of the token that corresponds to the amount of the capital received by the lending institution D (the capital transferor), where an input of the encryption function is the amount quota_d of the token, and another input is a public key pk_c of the user C (the capital transferee). In addition, identification information of the public key of the user C, for example, a hash value hash(pk_c) of the public key pk_c, is further used as a part of the transaction request and sent to the blockchain system.

Figure 5:
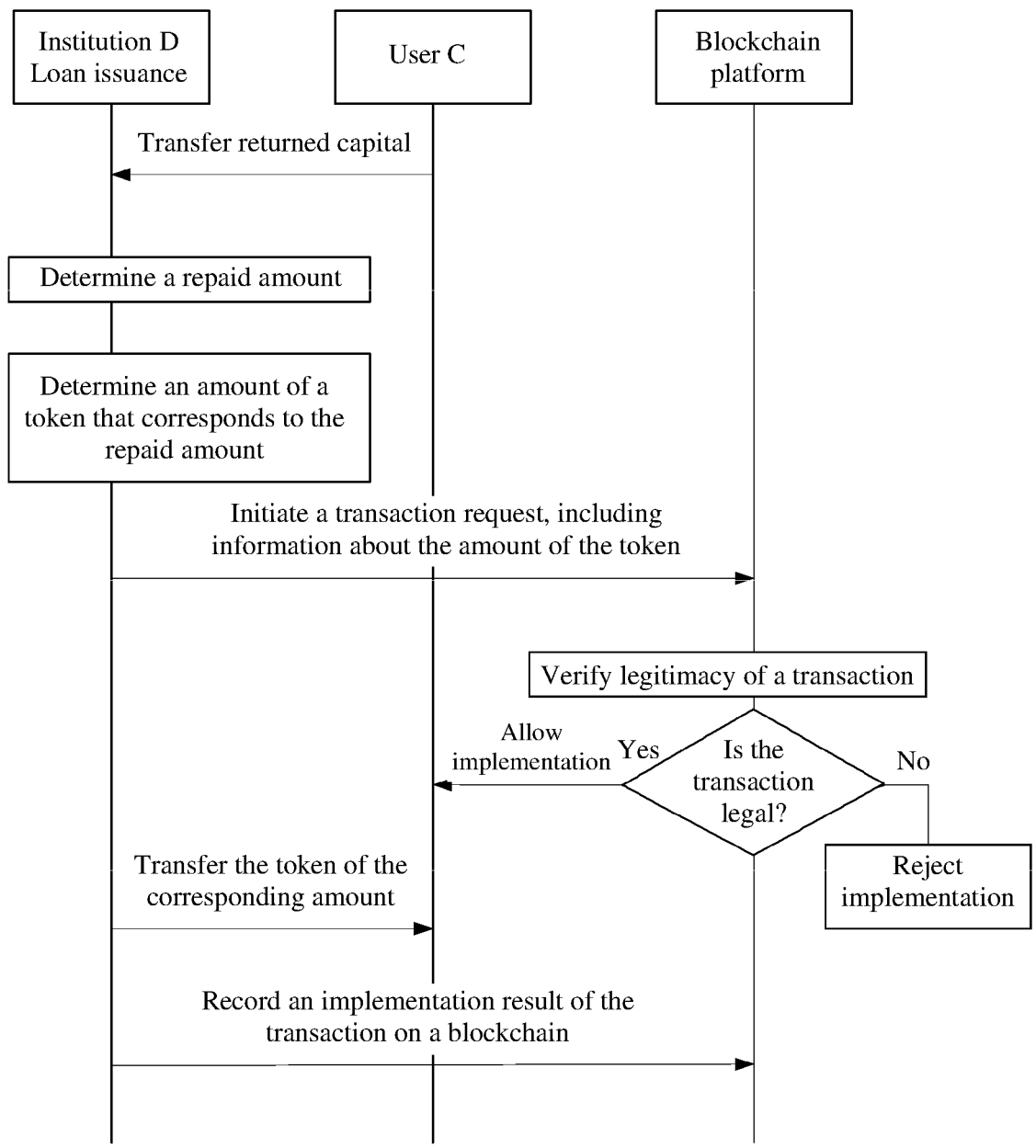
FIG. 5 is a schematic diagram of a service flow in a repayment phase of a capital transfer method in a capital lending scenario, according to an embodiment of the present application.

Referring now to FIG. 5, FIG. 5 is a schematic diagram of a service flow in a repayment phase.

First, the user C sends, to the loan issuance institution D, capital that needs to be returned, to achieve a repayment of a real currency.

Second, the institution D determines an amount (equivalent to the first amount of the first resource or the first amount of the capital, and represented as a real currency) of the capital received from and repaid by the user C, and determines, based on this, an amount (equivalent to the second amount of the second resource or the second amount of the token, and represented as a virtual currency) of the token that corresponds to the repaid amount.

Third, the institution D (serving as the resource transferor or the transferor) initiates a transaction request to a blockchain platform, where the transaction request includes information about the amount of the token. To protect privacy, the information is encrypted information obtained after the amount of the token is encrypted. After verifying legitimacy of the transaction request, the blockchain platform allows the institution D to implement the transaction request. In addition, after the institution D transfers the token of the corresponding amount to the user C (serving as the resource transferee or the transferee), an implementation result of the transaction is recoded on the blockchain.

In this way, the user C completes the loan repayment, and the institution D completes the loan recovery. After the transaction is completed, the amount of the token held by the user C is increased, and the amount of the held token reflects a credit limit of the loan that the user C is allowed to borrow.

The capital transfer method provided in the embodiments of the present application is used in all the foregoing phases. Privacy of both transaction parties is protected by converting an amount of capital representing a real currency into an amount of a token representing a virtual currency and encrypting an amount of a token circulating in the blockchain. Even if a plurality of loan issuance institutions joins the blockchain for loan issuance, a total amount of a loan applied for by a user from the plurality of issuance institutions does not exceed an allowed loan amount, thereby reducing lending risks of the lending institutions. This is because, as described in the foregoing examples, the token reflecting the loan amount is issued by the specific institution B, an amount of a token held by the user also changes accordingly with borrowing and repayment behaviors of the user, and transactions causing these changing processes are all written on the blockchain. Therefore, authenticity and reliability of the amount of the token can be ensured by using features of publicity, transparency, and non-tamperability of the blockchain technology, thereby ensuring that the user cannot over-apply for a loan.

In addition, in the foregoing transactions reflecting the changes in the token of the loan amount, the amount of each transferred token is encrypted, thereby hiding the specific transaction information of both transaction parties. Therefore, privacy information of both the capital transferor and transferee can be protected during capital transfer.

Figure 6:
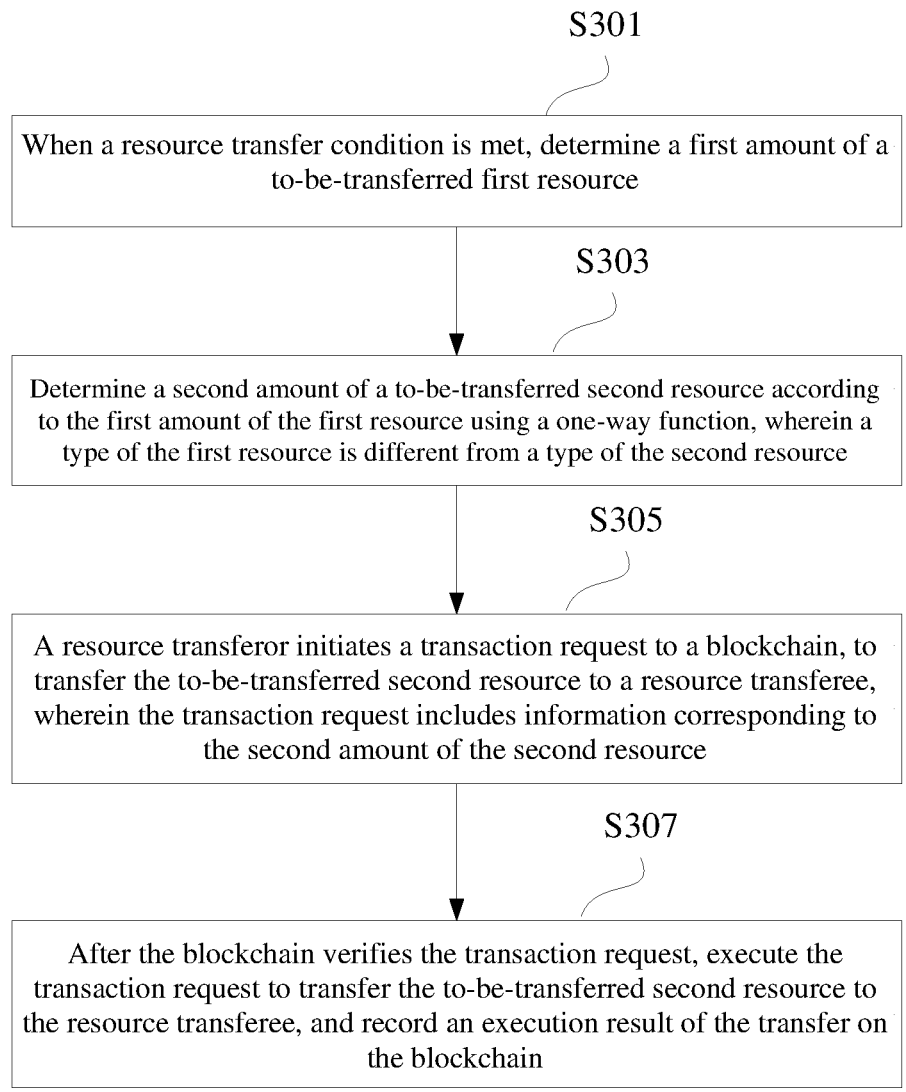
FIG. 6 is a flowchart of a resource transfer method, according to an embodiment of the present application.

An embodiment of the present application further provides a blockchain-based resource transfer method. Referring FIG. 6, the blockchain-based resource transfer method may include the following steps.

In S301, when a resource transfer condition is satisfied, the method may determine a first amount of a to-be-transferred first resource.

In S303, the method may determine a second amount of a to-be-transferred second resource according to the first amount of the first resource using a one-way function, where a type of the first resource is different from a type of the second resource.

In S305, a resource transferor initiates a transaction request to a blockchain to transfer the to-be-transferred second resource to a resource transferee, where the transaction request includes information corresponding to the second amount of the second resource.

In S307, after the blockchain verifies the transaction request, the method may execute the transaction request to transfer the to-be-transferred second resource to the resource transferee, and record an execution result of the transfer on the blockchain.

In this embodiment, a first resource that actually needs to be transferred is converted into a second resource for transferring, and a purpose of resource transfer can be achieved by transferring the second resource. In addition, conversion between the amounts of the first resource and the second resource is implemented using the one-way function, and use of features of the one-way function makes a third party other than both transaction parties incapable of inferring the first amount of the first resource according to the second amount of the second resource, thereby hiding the amount of the actually transferred first resource, and achieving a function of protecting transaction privacy.

Further, when the second amount of the second resource is determined according to the first amount of the first resource using the one-way function, the first amount of the first resource and a random number may be used as inputs of the one-way function, and an output of the one-way function may be determined as the second amount of the second resource. In such as manner, a feature of the one-way function is used, and even if the second amount is not encrypted in a subsequently initiated transaction request, but instead, the second amount obtained through conversion using the one-way function is directly added to the transaction request, a real amount for the resource transfer (that is, the first amount of the first resource) can still be protected to some extent. Certainly, based on this, the second amount is further encrypted to obtain the first encrypted amount information, and the first encrypted amount information is added to the transaction request initiated by the resource transferor, thereby better protecting privacy information of the resource transfer transaction.

When conversion between the amounts of the first resource and the second resource is implemented using the one-way function, the resource transferor further needs to send the random number (as an input of the one-way function) used during the conversion to the resource transferee, for the resource transferee to perform reverse conversion of resource types, and infer the first amount of the first resource. During specific implementation, the random number may be encrypted before the resource transferor initiates the transaction request to the blockchain, and then, the initiated transaction request carries an encrypted random number generated by encrypting the random number, thereby avoiding leakage of the random number, and protecting the privacy information of the resource transfer transaction. Specifically, the random number may be encrypted by using a public key of the resource transferee. In this case, the random number can be decrypted only by using a private key of the resource transferee, thereby protecting transaction privacy.

When the amount of the first resource and the second resource are converted using the one-way function, a random number used in each transaction should change, thereby avoiding leakage of transaction amount information.

Figure 7:
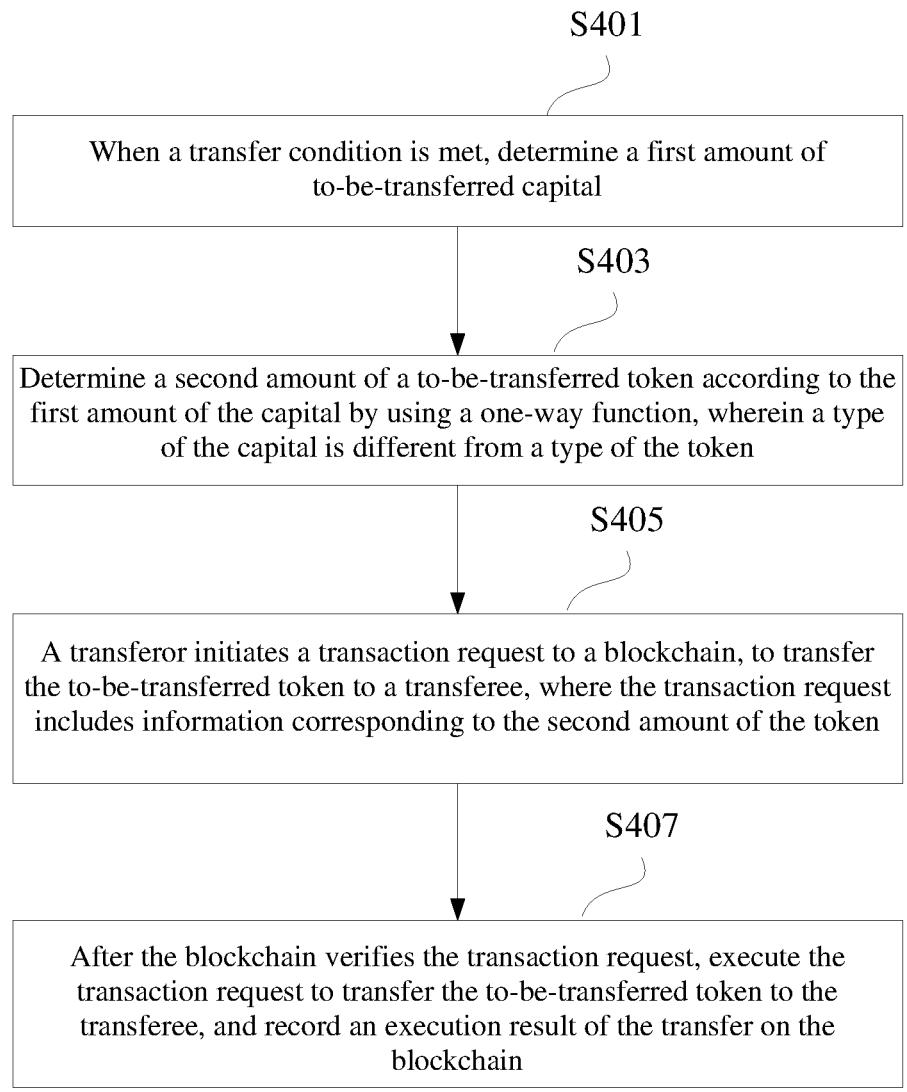
FIG. 7 is a flowchart of a capital transfer method, according to an embodiment of the present application.

This embodiment may also be applied to an application scenario of capital lending. In this scenario, the first resource is specifically capital, and the second resource is specifically a token. Referring to FIG. 7, a corresponding blockchain-based capital transfer method may include the following steps.

In S401, when a transfer condition is met, the method may include determining a first amount of to-be-transferred capital.

In S403, the method may include determining a second amount of a to-be-transferred token according to the first amount of the capital using a one-way function, where a type of the capital is different from a type of the token.

In S405, a transferor may initiate a transaction request to a blockchain to transfer the to-be-transferred token to a transferee, where the transaction request includes information corresponding to the second amount of the token.

In S407, after the blockchain verifies the transaction request, the method may include executing the transaction request to transfer the to-be-transferred token to the transferee, and record an execution result of the transfer on the blockchain.

The manner of implementing conversion between the first resource and the second resource (or conversion between the amounts of the capital and the token) using the one-way function in this embodiment may be implemented in combination with the foregoing plurality of embodiments, and all the embodiments are also applicable to each specific service flow. Details are not described herein again.

Figure 8:
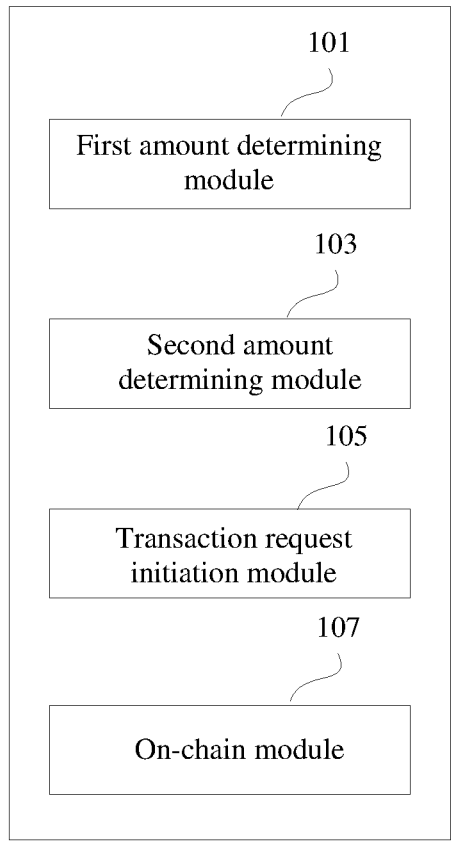
FIG. 8 is a block diagram of a resource transfer apparatus, according to an embodiment of the present application.

Corresponding to the blockchain-based resource transfer method provided in FIG. 1, an embodiment of the present application further provides a blockchain-based resource transfer apparatus. Referring to FIG. 8, the apparatus includes: a first amount determining module 101, configured to: when a resource transfer condition is satisfied, determine a first amount of a to-be-transferred first resource; a second amount determining module 103, configured to determine a second amount of a to-be-transferred second resource according to the first amount of the first resource, where a type of the first resource is different from a type of the second resource; a transaction request initiation module 105, configured to: initiate, by a resource transferor, a transaction request to a blockchain, to transfer the to-be-transferred second resource to a resource transferee, where the transaction request includes first encrypted amount information obtained by encrypting the second amount of the second resource; and an on-chain module 107, configured to: after the blockchain verifies the transaction request, execute the transaction request, transfer the to-be-transferred second resource to the resource transferee, and record an execution result of the transfer on the blockchain.

Figure 9:
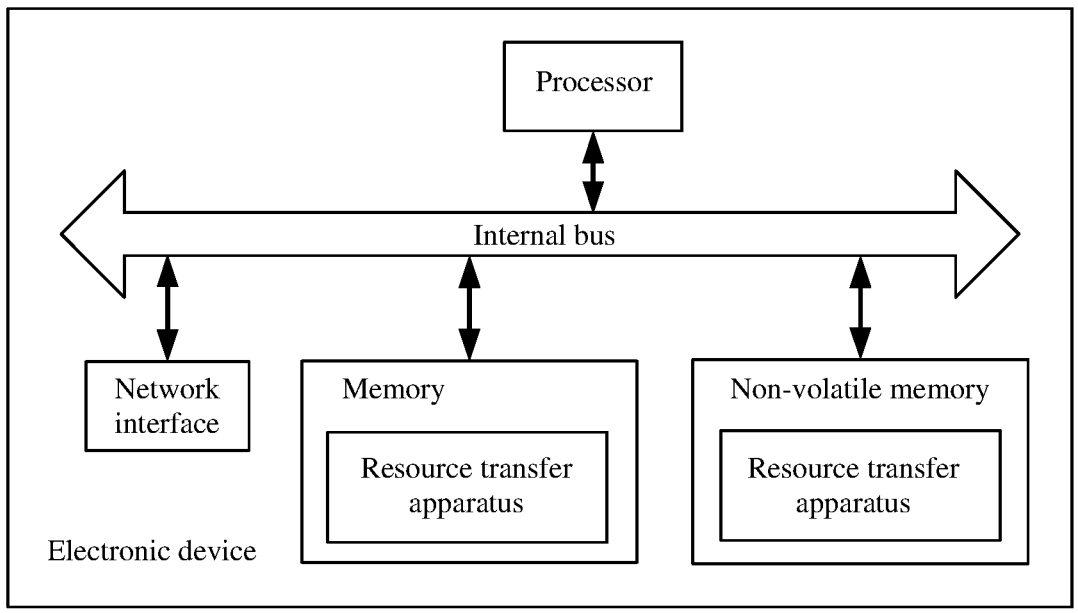
FIG. 9 is a schematic structural diagram of an electronic device, according to an embodiment of the present application.

FIG. 9 is a schematic structural diagram of an electronic device, according to an embodiment of the present application. Referring to FIG. 9, at a hardware level, the electronic device includes a processor, and optionally, further includes an internal bus, a network interface, and a memory. The memory may include an internal memory, for example, a high-speed random-access memory (RAM), and may further include a non-volatile memory, for example, at least one magnetic disk storage. Certainly, the electronic device may further include hardware required by other services.

The processor, the network interface, and the memory may be connected to one another by using the internal bus. The internal bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of illustration, in FIG. 9, the bus is represented by using only one double-sided arrow, which, however, does not indicate that there is only one bus or only one type of bus.

The memory is configured to store a program. Specifically, the program may include program code, where the program code includes a computer operation instruction. The memory may include an internal memory and a non-volatile memory, and provides an instruction and data for the processor.

The processor reads a corresponding computer program from the non-volatile memory to the internal memory for running, forming a blockchain-based resource transfer apparatus at a logic level. The processor executes the program stored in the memory, for specifically performing the following operations: when a resource transfer condition is satisfied, determining a first amount of a to-be-transferred first resource; determining a second amount of a to-be-transferred second resource according to the first amount of the first resource, where a type of the first resource is different from a type of the second resource; initiating, by a resource transferor, a transaction request to a blockchain, to transfer the to-be-transferred second resource to a resource transferee, where the transaction request includes first encrypted amount information obtained by encrypting the second amount of the second resource; and after the blockchain verifies the transaction request, executing the transaction request, transferring the to-be-transferred second resource to the resource transferee, and record an execution result of the transfer on the blockchain.

The method performed by the blockchain-based resource transfer apparatus and disclosed in the embodiment shown in FIG. 1 of the present application may be applied to the processor or implemented by the processor. The processor may be an integrated circuit chip and has a signal processing capability. In an implementation process, the steps of the foregoing method may be implemented by using a hardware integrated logic circuit in the processor or instructions in a form of software. The foregoing processor may be a general purpose processor, including a central processing unit (CPU), a network processor (NP), or the like; or may be a digital signal processor (DSP), an application-specific integrated circuit (ASIC), a field-programmable gate array (FPGA), or another programmable logic device, discrete gate or transistor logic device, or discrete hardware component. The processor may implement or perform the methods, the steps, and logical block diagrams that are disclosed in the embodiments of the present application. The general purpose processor may be a microprocessor, or the processor may be any conventional processor or the like. Steps of the methods disclosed with reference to the embodiments of the present application may be directly performed and completed by using a hardware decoding processor, or may be performed and completed by using a combination of hardware and a software module in the decoding processor. The software module may be located in a mature storage medium in the field, such as a RAM, a flash memory, a read-only memory (ROM), a programmable ROM, an electrically erasable programmable memory, or a register. The storage medium is located in the memory, and the processor reads information in the memory and completes the steps of the foregoing methods in combination with hardware of the processor.

The electronic device may further perform the method in FIG. 1 that is performed by the blockchain-based resource transfer apparatus, and implement the function of the blockchain-based resource transfer apparatus in the embodiment shown in FIG. 1. Details are not described herein again in this embodiment of the present application.

An embodiment of the present application further provides a computer-readable storage medium, the computer-readable storage medium stores one or more programs, the one or more programs include an instruction, and when the instruction is executed by an electronic device that includes a plurality of application programs, the electronic device can be enabled to perform the method in the embodiment shown in FIG. 1 and that is performed by the blockchain-based resource transfer apparatus, and is specifically configured to perform: when a resource transfer condition is satisfied, determining a first amount of a to-be-transferred first resource; determining a second amount of a to-be-transferred second resource according to the first amount of the first resource, where a type of the first resource is different from a type of the second resource; initiating, by a resource transferor, a transaction request to a blockchain, to transfer the to-be-transferred second resource to a resource transferee, where the transaction request includes first encrypted amount information obtained by encrypting the second amount of the second resource; and after the blockchain verifies the transaction request, executing the transaction request, transferring the to-be-transferred second resource to the resource transferee, and recording an execution result of the transfer on the blockchain.

Figure 10:
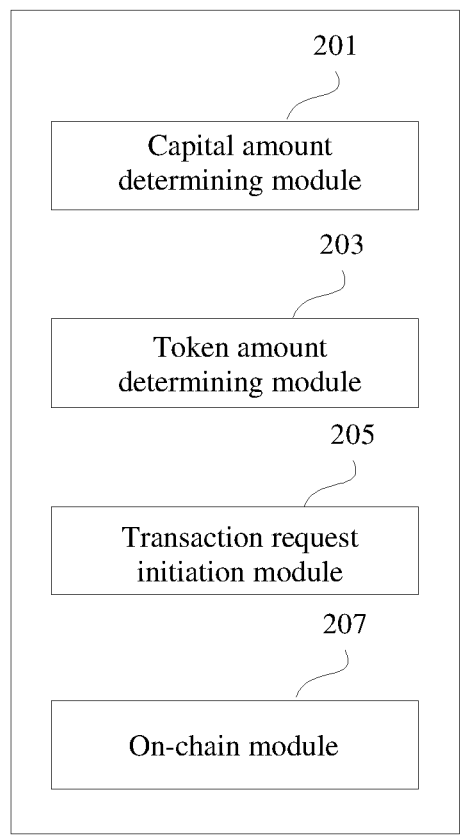
FIG. 10 is a block diagram of a capital transfer apparatus, according to an embodiment of the present application.

Corresponding to the blockchain-based capital transfer method provided in FIG. 2, an embodiment of the present application further provides a blockchain-based capital transfer apparatus. Referring to FIG. 10, the apparatus includes: a capital amount determining module 201, configured to: when a transfer condition is met, determine a first amount of to-be-transferred capital; a token amount determining module 203, configured to: determine a second amount of a to-be-transferred token according to the first amount of the capital, where a type of the capital is different from a type of the token; a transaction request initiation module 205, configured to: initiate, by a transferor, a transaction request to a blockchain, to transfer the to-be-transferred token to a transferee, where the transaction request includes first encrypted amount information obtained by encrypting the second amount of the token; and an on-chain module 207, configured to: after the blockchain verifies the transaction request, execute the transaction request to transfer the to-be-transferred token to the transferee, and record an execution result of the transfer on the blockchain.

Figure 11:
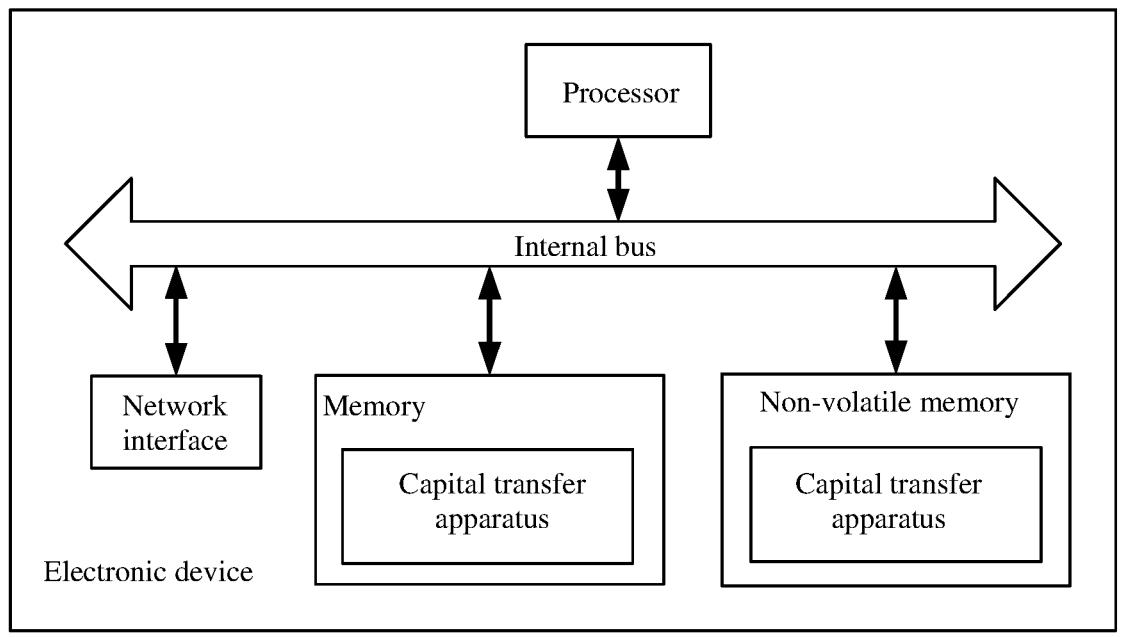
FIG. 11 is a schematic structural diagram of an electronic device, according to an embodiment of the present application.

FIG. 11 is a schematic structural diagram of an electronic device, according to an embodiment of the present application. Referring to FIG. 11, at a hardware level, the electronic device includes a processor, and optionally, further includes an internal bus, a network interface, and a memory. The memory may include an internal memory, for example, a high-speed RAM, and may further include a non-volatile memory, for example, at least one magnetic disk storage. Certainly, the electronic device may further include hardware required by other services.

The processor, the network interface, and the memory may be connected to one another by using the internal bus. The internal bus may be an ISA bus, a PCI bus, an EISA bus, or the like. The bus may be classified into an address bus, a data bus, a control bus, and the like. For ease of illustration, in FIG. 11, the bus is represented by using only one double-sided arrow, which, however, does not indicate that there is only one bus or only one type of bus.

The memory is configured to store a program. Specifically, the program may include program code, where the program code includes a computer operation instruction. The memory may include an internal memory and a non-volatile memory, and provides an instruction and data for the processor.

The processor reads a corresponding computer program from the non-volatile memory to the internal memory for running, forming a blockchain-based capital transfer apparatus at a logic level. The processor executes the program stored in the memory, for specifically performing the following operations: when a transfer condition is met, determining a first amount of to-be-transferred capital; determining a second amount of a to-be-transferred token according to the first amount of the capital, where a type of the capital is different from a type of the token; initiating, by a transferor, a transaction request to a blockchain, to transfer the to-be-transferred token to a transferee, where the transaction request includes first encrypted amount information obtained by encrypting the second amount of the token; and after the blockchain verifies the transaction request, executing the transaction request, transferring the to-be-transferred token to the transferee, and recording an execution result of the transfer on the blockchain.

The method performed by the blockchain-based capital transfer apparatus and disclosed in the embodiment shown in FIG. 2 of the present application may be applied to the processor or implemented by the processor. The processor may be an integrated circuit chip and has a signal processing capability. In an implementation process, the steps of the foregoing method may be implemented by using a hardware integrated logic circuit in the processor or instructions in a form of software. The foregoing processor may be a general purpose processor, including a CPU, an NP, or the like; or may be a DSP, an ASIC, an FPGA, or another programmable logic device, discrete gate or transistor logic device, or discrete hardware component. The processor may implement or perform the methods, the steps, and logical block diagrams that are disclosed in the embodiments of the present application. The general purpose processor may be a microprocessor, or the processor may be any conventional processor or the like. Steps of the methods disclosed with reference to the embodiments of the present application may be directly performed and completed by using a hardware decoding processor, or may be performed and completed by using a combination of hardware and a software module in the decoding processor. The software module may be located in a mature storage medium in the field, such as a RAM, a flash memory, a ROM, a programmable ROM, an electrically erasable programmable memory, or a register. The storage medium is located in the memory, and the processor reads information in the memory and completes the steps of the foregoing methods in combination with hardware of the processor.

The electronic device may further perform the method in FIG. 2 that is performed by the blockchain-based capital transfer apparatus, and implement the function of the blockchain-based capital transfer apparatus in the embodiment shown in FIG. 2. Details are not described herein again in this embodiment of the present application.

An embodiment of the present application further provides a computer-readable storage medium, the computer-readable storage medium stores one or more programs, the one or more programs include an instruction, and when the instruction is executed by an electronic device that includes a plurality of application programs, the electronic device can be enabled to perform the method in the embodiment shown in FIG. 2 and that is performed by the blockchain-based capital transfer apparatus, and is specifically configured to perform: when a transfer condition is satisfied, determining a first amount of to-be-transferred capital; determining a second amount of a to-be-transferred token according to the first amount of the capital, where a type of the capital is different from a type of the token; initiating, by a transferor, a transaction request to a blockchain, to transfer the to-be-transferred token to a transferee, where the transaction request includes first encrypted amount information obtained by encrypting the second amount of the token; and after the blockchain verifies the transaction request, executing the transaction request, transferring the to-be-transferred token to the transferee, and recording an execution result of the transfer on the blockchain.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowchart and/or block diagram of the method, device (system), and computer program product of the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a persistent memory, a random-access memory (RAM) and/or a non-volatile memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should also be noted that the terms "include", "comprise" and any other variants mean to cover the non-exclusive inclusion. Therefore, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product implemented on one or more computer available storage media (including but not limited to a disk memory, a CD-ROM, an optical memory, and the like) including computer available program code.

The foregoing descriptions are merely embodiments of this application and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A blockchain-based method for information masking, comprising:
   determining, at a computer device of a borrower, according to an agreement with a lender, a first amount of capital to be transferred to the borrower from the lender;
   determining, at the computer device of the borrower, according to the first amount of capital, a value number of a second amount of a token based on an output of a function relationship that uses a value number of the first amount of the capital and a random number as inputs, wherein a resource type of the capital is different from a resource type of the token;
   encrypting, at the computer device of the borrower, using a public key of the lender, the random number to obtain an encrypted random number;
   encrypting, at the computer device of the borrower, the value number of the second amount of the token using the public key of the lender and a first encryption function to obtain first encrypted amount information;
   initiating, at the computer device of the borrower, a transaction request to a blockchain to transfer the second amount of the token from the borrower to the lender, wherein the transaction request comprises the encrypted random number, the first encrypted amount information, and a zero-knowledge proof that the value number of the second amount is less than a value number of an original amount of the token of the borrower, the value number of the second amount is positive, and the value number of the original amount is positive;
   verifying, by a plurality of blockchain nodes of the blockchain, the transaction request by executing a consensus algorithm;
   executing, by the plurality of blockchain nodes, after the blockchain nodes verify the transaction request, the transaction request to transfer the token from the borrower to the lender;
   recording, by the plurality of blockchain nodes, a result of the execution on the blockchain;
   obtaining, at a computer device of the lender, the encrypted random number from the blockchain;
   determining, at the computer device of the lender, the random number based on the encrypted random number and a private key of the lender;
   determining, at the computer device of the lender, the value number of the first amount of the capital based on the determined random number and the function relationship according to reverse conversion;
   after the second amount of the token is transferred to the lender, sending off the blockchain, at the computer device of the lender to the borrower, the first amount of the capital; and
   receiving off the blockchain, at the computer device of the lender from the borrower, the first amount of the capital; and
   in response to receiving the first amount of the capital, initiating, at the computer device of the lender, a different transaction request to the blockchain to transfer the second amount of the token from the lender to the borrower.

2. The method according to claim 1, wherein determining the value number of the second amount of the token comprises:
   inputting, at the computer device of the borrower, the value number of the first amount of the capital and the random number into the function relationship to output the value number of the second amount of the token.

3. The method according to claim 1, wherein the value number of the first amount of the capital and the resource type of the capital are unknown to the blockchain.

4. The method according to claim 1, wherein the transaction request further comprises a hash value of the public key of the lender and a hash value of a blockchain transaction stored on the blockchain recording the original amount of the token of the borrower.

5. The method according to claim 4, wherein the transaction request further comprises:
   an encryption of the amount value of the original amount based on a public key of the borrower; and
   a hash value of a public key of the borrower.

6. The method according to claim 4, wherein:
   the zero-knowledge proof indicates that the value number of the original amount is equal to a sum of the value number of the second amount and a value number of a balance of the token to be held by the borrower after the execution of the transaction request.

7. The method according to claim 4, further comprising:
   encrypting, at the computer device of the borrower, using a second encryption function, a balance of the token to be held by the borrower after the execution of the transaction request to obtain second encrypted amount information, wherein an input of the second encryption function is the balance of the token, and another input of the second encryption function is a public key of the borrower; and
   wherein the transaction request further comprises the second encrypted amount information and a hash value of the public key of the borrower.

8. A system, comprising:
   one or more processors; and
   one or more memories configured to store instructions executable by the one or more processors to cause the one or more processors to perform operations comprising:
      determining, at a borrower, according to an agreement with a lender, a first amount of capital to be transferred to the borrower from the lender;
      determining, at the borrower, according to the first amount of capital, a value number of a second amount of a token based on an output of a function relationship that uses a value number of the first amount of the capital and a random number as inputs, wherein a resource type of the capital is different from a resource type of the token;
      encrypting, at the borrower, using a public key of the lender, the random number to obtain an encrypted random number;
      encrypting, at the borrower, the value number of the second amount of the token using the public key of the lender and a first encryption function to obtain first encrypted amount information;

initiating, at the borrower, a transaction request to a blockchain to transfer the second amount of the token from the borrower to the lender, wherein the transaction request comprises the encrypted random number, the first encrypted amount information, and a zero-knowledge proof that the value number of the second amount is less than a value number of an original amount of the token of the borrower, the value number of the second amount is positive, and the value number of the original amount is positive;

verifying, by a plurality of blockchain nodes of the blockchain, the transaction request by executing a consensus algorithm;

executing, by the plurality of blockchain nodes, after the blockchain nodes verify the transaction request, the transaction request to transfer the token from the borrower to the lender;

recording, by the plurality of blockchain nodes, a result of the execution on the blockchain;

obtaining, at the lender, the encrypted random number from the blockchain;

determining, at the lender, the random number based on the encrypted random number and a private key of the lender;

determining, at the lender, the value number of the first amount of the capital based on the determined random number and the function relationship according to reverse conversion;

after the second amount of the token is transferred to the lender, sending off the blockchain, at the lender to the borrower, the first amount of the capital;

receiving off the blockchain, at the lender from the borrower, the first amount of the capital; and in response to receiving the first amount of the capital, initiating, at the lender, a different transaction request to the blockchain to transfer the second amount of the token from the lender to the borrower.

9. The system according to claim 8, wherein determining the value number of the second amount of the token comprises:

inputting, at the borrower, the value number of the first amount of the capital and the random number into the function relationship to output the value number of the second amount of the token.

10. The system according to claim 8, wherein the value number of the first amount of the capital and the resource type of the capital are unknown to the blockchain.

11. The system according to claim 8, wherein the transaction request further comprises a hash value of the public key of the lender and a hash value of a blockchain transaction stored on the blockchain recording the original amount of the token of the borrower.

12. The system according to claim 11, wherein the transaction request further comprises:

an encryption of the amount value of the original amount based on a public key of the borrower; and a hash value of a public key of the borrower.

13. The system according to claim 11, wherein:

the zero-knowledge proof indicates that the value number of the original amount is equal to a sum of the value number of the second amount and a value number of a balance of the token to be held by the borrower after the execution of the transaction request.

14. The system according to claim 11, the operations further comprising:

encrypting, at the borrower, using a second encryption function, a balance of the token to be held by the borrower after the execution of the transaction request to obtain second encrypted amount information, wherein an input of the second encryption function is the balance of the token, and another input of the second encryption function is a public key of the borrower; and wherein the transaction request further comprises the second encrypted amount information and a hash value of the public key of the borrower.

15. A non-transitory computer-readable storage medium configured with instructions executable by one or more processors to cause the one or more processors to perform operations comprising:

determining, at a borrower, according to an agreement with a lender, a first amount of capital to be transferred to the borrower from the lender;

determining, at the borrower, according to the first amount of capital, a value number of a second amount of a token based on an output of a function relationship that uses a value number of the first amount of the capital and a random number as inputs, wherein a resource type of the capital is different from a resource type of the token;

encrypting, at the borrower, using a public key of the lender, the random number to obtain an encrypted random number;

encrypting, at the borrower, the value number of the second amount of the token using the public key of the lender and a first encryption function to obtain first encrypted amount information;

initiating, at the borrower, a transaction request to a blockchain to transfer the second amount of the token from the borrower to the lender, wherein the transaction request comprises the encrypted random number, the first encrypted amount information, and a zero-knowledge proof that the value number of the second amount is less than a value number of an original amount of the token of the borrower, the value number of the second amount is positive, and the value number of the original amount is positive;

verifying, by a plurality of blockchain nodes of the blockchain, the transaction request by executing a consensus algorithm;

executing, by the plurality of blockchain nodes, after the blockchain nodes verify the transaction request, the transaction request to transfer the token from the borrower to the lender;

recording, by the plurality of blockchain nodes, a result of the execution on the blockchain;

obtaining, at the lender, the encrypted random number from the blockchain;

determining, at the lender, the random number based on the encrypted random number and a private key of the lender;

determining, at the lender, the value number of the first amount of the capital based on the determined random number and the function relationship according to reverse conversion;

after the second amount of the token is transferred to the lender, sending off the blockchain, at the lender to the borrower, the first amount of the capital;

receiving off the blockchain, at the lender from the borrower, the first amount of the capital; and in response to receiving the first amount of the capital, initiating, at the lender, a different transaction request to the blockchain to transfer the second amount of the token from the lender to the borrower.

16. The non-transitory computer-readable storage medium according to claim 15, wherein determining the value number of the second amount of the token comprises:
inputting, at the borrower, the value number of the first amount of the capital and the random number into the function relationship to output the value number of the second amount of the token.

* * * * *